United States Patent
Peng et al.

(10) Patent No.: US 12,279,224 B2
(45) Date of Patent: Apr. 15, 2025

(54) RADIO FREQUENCY MULTIPATH DETECTION

(71) Applicant: QUALCOMM Incorporated, San Diego, CA (US)

(72) Inventors: Yuxiang Peng, Sunnyvale, CA (US); Ning Luo, Cupertino, CA (US); Yinghua Yang, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 368 days.

(21) Appl. No.: 18/050,860

(22) Filed: Oct. 28, 2022

(65) Prior Publication Data

US 2024/0147408 A1     May 2, 2024

(51) Int. Cl.
  *H04L 1/00*      (2006.01)
  *H04B 17/336*  (2015.01)
  *H04W 64/00*   (2009.01)

(52) U.S. Cl.
  CPC .......... *H04W 64/00* (2013.01); *H04B 17/336* (2015.01)

(58) Field of Classification Search
  CPC ... H04W 72/048; H04W 16/28; H04W 72/56; H04W 72/23; H04W 72/0446; H04W 72/232; H04W 52/146; H04L 5/0026
  See application file for complete search history.

(56) References Cited

U.S. PATENT DOCUMENTS

2022/0070028 A1* 3/2022 Yerramalli .............. G01S 3/043
2022/0326360 A1* 10/2022 Ehrlich .................... G01S 17/89

FOREIGN PATENT DOCUMENTS

CN        114488228 A      5/2022

OTHER PUBLICATIONS

Brenneman M., et al., "An Efficient Algorithm for Short Delay Time Multipath Estimation and Mitigation", GNSS 2010—Proceedings of the 23rd International Technical Meeting of the Satellite Division of the Institute of Navigation, 8551 Rixlew Lane Suite 360 Manassas, VA 20109, USA, Sep. 24, 2010, pp. 152-160, XP056000180.
International Search Report and Written Opinion—PCT/US2023/074044—ISA/EPO—Dec. 21, 2023.
Zhang Z., et al., "Real-time Carrier Phase Multipath Detection Based on Dual-frequency C/N0 Data", GPS Solutions, Springer Berlin Heidelberg, Berlin/Heidelberg, vol. 23, No. 1, Nov. 1, 2018, pp. 1-13, XP036691002, Abstract, pp. 2-4, 8, Figure 2.

* cited by examiner

*Primary Examiner* — Phuoc H Doan
(74) *Attorney, Agent, or Firm* — QUALCOMM Incorporated

(57) ABSTRACT

A multipath condition detection method includes: determining a first signal quality value corresponding to a first wireless signal, of a first frequency and from a signal source, received by a receiver of a mobile device; determining a second signal quality value corresponding to a second wireless signal, of a second frequency that is different from the first frequency, received by the receiver; and determining whether at least one difference value, corresponding to the first signal quality value and the second signal quality value, is indicative of the mobile device being in a multipath condition with respect to the signal source.

41 Claims, 8 Drawing Sheets

RADIO FREQUENCY MULTIPATH DETECTION

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service, a fourth-generation (4G) service (e.g., Long Term Evolution (LTE) or WiMax), a fifth-generation (5G) service, etc. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Orthogonal Frequency Division Multiple Access (OFDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

Signals received by mobile devices, e.g., 5G signals, satellite vehicle signals, etc., may be multipath signals that may lead to inaccurate determinations of position of the mobile devices. In RF (Radio Frequency) based positioning, navigation, and timing (PNT) technologies, signal multipath may be a significant error source affecting PNT performance. The inaccurate positions may lead to undesirable actions and/or inaction, e.g., incorrect directions, autonomous driving decisions that result in crashes, etc.

SUMMARY

An example apparatus includes: a memory; and a processor, communicatively coupled to the memory, configured to: determine a first signal quality value corresponding to a first wireless signal, of a first frequency and from a signal source, received by a receiver of a mobile device; determine a second signal quality value corresponding to a second wireless signal, of a second frequency that is different from the first frequency, received by the receiver; and determine whether at least one difference value, corresponding to the first signal quality value and the second signal quality value, is indicative of the mobile device being in a multipath condition with respect to the signal source.

An example multipath condition detection method includes: determining a first signal quality value corresponding to a first wireless signal, of a first frequency and from a signal source, received by a receiver of a mobile device; determining a second signal quality value corresponding to a second wireless signal, of a second frequency that is different from the first frequency, received by the receiver; and determining whether at least one difference value, corresponding to the first signal quality value and the second signal quality value, is indicative of the mobile device being in a multipath condition with respect to the signal source.

Another example apparatus includes: means for determining a first signal quality value corresponding to a first wireless signal, of a first frequency and from a signal source, received by a receiver of a mobile device; means for determining a second signal quality value corresponding to a second wireless signal, of a second frequency that is different from the first frequency, received by the receiver; and means for determining whether at least one difference value, corresponding to the first signal quality value and the second signal quality value, is indicative of the mobile device being in a multipath condition with respect to the signal source.

An example non-transitory, processor-readable storage medium includes processor-readable instructions to cause a processor of an apparatus to: determine a first signal quality value corresponding to a first wireless signal, of a first frequency and from a signal source, received by a receiver of a mobile device; determine a second signal quality value corresponding to a second wireless signal, of a second frequency that is different from the first frequency, received by the receiver; and determine whether at least one difference value, corresponding to the first signal quality value and the second signal quality value, is indicative of the mobile device being in a multipath condition with respect to the signal source.

DETAILED DESCRIPTION

Figure 1:
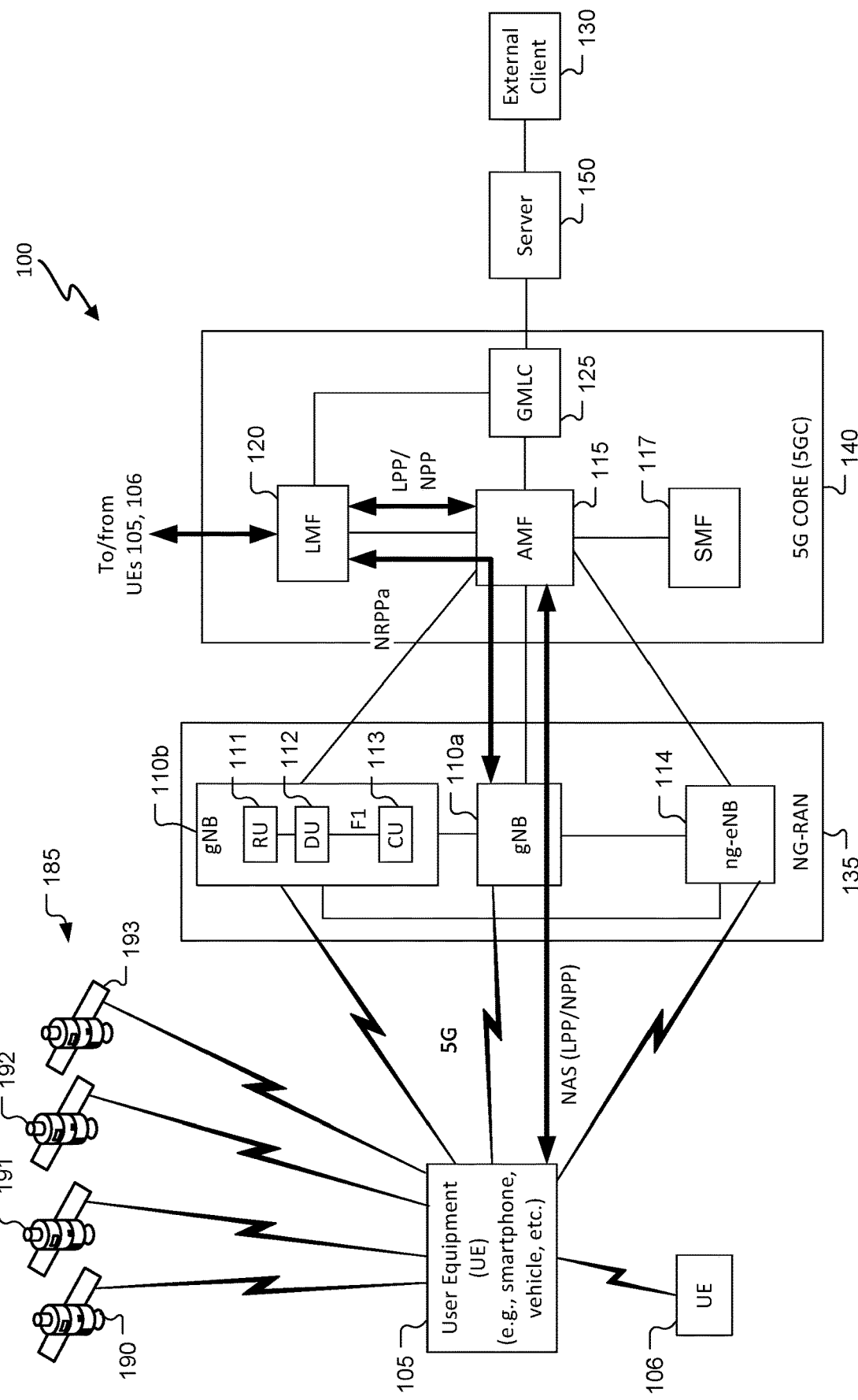
FIG. 1 is a simplified diagram of an example wireless communications system.

Techniques are discussed herein for detection of multipath conditions. For example, RF (Radio Frequency) signals of different frequencies received by a mobile device from the same signal source (the same entity, although possibly from different components of the entity, e.g., different antennas) may be analyzed to determine whether a multipath condition exists between the mobile device and the signal source. A measure of signal quality for each of the RF signals of different frequencies may be used to determine whether the multipath condition is present. For example, a standard deviation of residuals of a measure of signal strength being larger than a threshold and/or differences between the measure of signal strength for the different signals may be indicative of the multipath condition. The signal source may be any of a variety of apparatus, e.g., a satellite vehicle (SV), a Low Earth Orbit apparatus, a base station (e.g., a cellular network tower), an access point, etc. The RF signals may be any of a variety of types of signals, e.g., satellite positioning system signals, 5G NR signals, LTE signals, WiFi signals, UWB (Ultra Wideband) signals, Bluetooth® signals, etc. These techniques are examples, and other techniques may be implemented.

Items and/or techniques described herein may provide one or more of the following capabilities, as well as other capabilities not mentioned. Multipath conditions may be detected accurately. Position estimate accuracy may be improved, e.g., be disregarding and/or de-weighting a measurement based on a multipath signal. Negative consequences (e.g., autonomous driving vehicle collisions) of poor position estimates may be avoided. Position estimation convergence time may be reduced and/or positioning robustness improved. Other capabilities may be provided and not every implementation according to the disclosure must provide any, let alone all, of the capabilities discussed.

Obtaining the locations of mobile devices that are accessing a wireless network may be useful for many applications including, for example, emergency calls, personal navigation, consumer asset tracking, locating a friend or family member, etc. Existing positioning methods include methods based on measuring radio signals transmitted from a variety of devices or entities including satellite vehicles (SVs) and terrestrial radio sources in a wireless network such as base stations and access points. It is expected that standardization for the 5G wireless networks will include support for various positioning methods, which may utilize reference signals transmitted by base stations in a manner similar to which LTE wireless networks currently utilize Positioning Reference Signals (PRS) and/or Cell-specific Reference Signals (CRS) for position determination.

The description herein may refer to sequences of actions to be performed, for example, by elements of a computing device. Various actions described herein can be performed by specific circuits (e.g., an application specific integrated circuit (ASIC)), by program instructions being executed by one or more processors, or by a combination of both. Sequences of actions described herein may be embodied within a non-transitory computer-readable medium having stored thereon a corresponding set of computer instructions that upon execution would cause an associated processor to perform the functionality described herein. Thus, the various examples described herein may be embodied in a number of different forms, all of which are within the scope of the disclosure, including claimed subject matter.

As used herein, the terms "user equipment" (UE) and "base station" are not specific to or otherwise limited to any particular Radio Access Technology (RAT), unless otherwise noted. In general, such UEs may be any wireless communication device (e.g., a mobile phone, router, tablet computer, laptop computer, consumer asset tracking device, Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," a "mobile device," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi networks (e.g., based on IEEE (Institute of Electrical and Electronics Engineers) 802.11, etc.) and so on.

A base station may operate according to one of several RATs in communication with UEs depending on the network in which it is deployed. Examples of a base station include an Access Point (AP), a Network Node, a NodeB, an evolved NodeB (eNB), or a general Node B (gNodeB, gNB). In addition, in some systems a base station may provide purely edge node signaling functions while in other systems it may provide additional control and/or network management functions.

UEs may be embodied by any of a number of types of devices including but not limited to printed circuit (PC) cards, compact flash devices, external or internal modems, wireless or wireline phones, smartphones, tablets, consumer asset tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

As used herein, the term "cell" or "sector" may correspond to one of a plurality of cells of a base station, or to the base station itself, depending on the context. The term "cell" may refer to a logical communication entity used for communication with a base station (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrowband Internet-of-Things (NB-IoT), enhanced mobile broadband (eMBB), or others) that may provide access for different types of devices. In some examples, the term "cell" may refer to a portion of a geographic coverage area (for example, a sector) over which the logical entity operates.

Referring to FIG. 1, an example of a communication system 100 includes a UE 105, a UE 106, a Radio Access Network (RAN), here a Fifth Generation (5G) Next Generation (NG) RAN (NG-RAN) 135, a 5G Core Network (5GC) 140, and a server 150. The UE 105 and/or the UE 106 may be, e.g., an IoT device, a location tracker device, a cellular telephone, a vehicle (e.g., a car, a truck, a bus, a boat, etc.), or other device. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the 3rd Generation Partnership Project (3GPP). Accordingly, the NG-RAN 135 and the 5GC 140 may conform to current or future standards for 5G support from 3GPP. The NG-RAN 135 may be another type of RAN, e.g., a 3G RAN, a 4G Long Term Evolution (LTE) RAN, etc. The UE 106 may be configured and coupled similarly to the UE 105 to send and/or receive signals to/from similar other entities in the system 100, but such signaling is not indicated in FIG. 1 for the sake of simplicity of the figure. Similarly, the discussion focuses on the UE 105 for the sake of simplicity. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110*a*, 110*b*, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110*a*, 110*b* and the ng-eNB 114 are communicatively coupled to each other, are each configured to bi-directionally wirelessly communicate with the UE 105, and are each communicatively coupled to, and configured to bi-directionally communicate with, the AMF 115. The gNBs 110*a*, 110*b*, and the ng-eNB 114 may be referred to as base stations (BSs). The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions. Base stations such as the gNBs 110*a*, 110*b* and/or the ng-eNB 114 may be a macro cell (e.g., a high-power cellular base station), or a small cell (e.g., a low-power cellular base station), or an access point (e.g., a short-range base station configured to communicate with short-range technology such as WiFi, WiFi-Direct (WiFi-D), Bluetooth®, Bluetooth®-low energy (BLE), Zigbee, etc. One or more base stations, e.g., one or more of the gNBs 110*a*, 110*b* and/or the ng-eNB 114 may be configured to communicate with the UE 105 via multiple carriers. Each of the gNBs 110*a*, 110*b* and/or the ng-eNB 114 may provide communication coverage for a respective geographic region, e.g., a cell. Each cell may be partitioned into multiple sectors as a function of the base station antennas.

FIG. 1 provides a generalized illustration of various components, any or all of which may be utilized as appropriate, and each of which may be duplicated or omitted as necessary. Specifically, although one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110*a*, 110*b*, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110*a*, 110*b*, or the LMF 120 based on measurement quantities received at the UE 105 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110*a*, 110*b* are examples and may, in various embodiments, be replaced by or include various other location server functionality and/or base station functionality respectively.

The system 100 is capable of wireless communication in that components of the system 100 can communicate with one another (at least some times using wireless connections) directly or indirectly, e.g., via the gNBs 110*a*, 110*b*, the ng-eNB 114, and/or the 5GC 140 (and/or one or more other devices not shown, such as one or more other base transceiver stations). For indirect communications, the communications may be altered during transmission from one entity to another, e.g., to alter header information of data packets, to change format, etc. The UE 105 may include multiple UEs and may be a mobile wireless communication device, but may communicate wirelessly and via wired connections. The UE 105 may be any of a variety of devices, e.g., a smartphone, a tablet computer, a vehicle-based device, etc., but these are examples as the UE 105 is not required to be any of these configurations, and other configurations of UEs may be used. Other UEs may include wearable devices (e.g., smart watches, smart jewelry, smart glasses or headsets, etc.). Still other UEs may be used, whether currently existing or developed in the future. Further, other wireless devices (whether mobile or not) may be implemented within the system 100 and may communicate with each other and/or with the UE 105, the gNBs 110*a*, 110*b*, the ng-eNB 114, the 5GC 140, and/or the external client 130. For example, such other devices may include internet of thing (IoT) devices, medical devices, home entertainment and/or automation devices, etc. The 5GC 140 may communicate with the external client 130 (e.g., a computer system), e.g., to allow the external client 130 to request and/or receive location information regarding the UE 105 (e.g., via the GMLC 125).

The UE 105 or other devices may be configured to communicate in various networks and/or for various purposes and/or using various technologies (e.g., 5G, Wi-Fi communication, multiple frequencies of Wi-Fi communication, satellite positioning, one or more types of communications (e.g., GSM (Global System for Mobiles), CDMA (Code Division Multiple Access), LTE (Long Term Evolution), V2X (Vehicle-to-Everything, e.g., V2P (Vehicle-to-Pedestrian), V2I (Vehicle-to-Infrastructure), V2V (Vehicle-to-Vehicle), etc.), IEEE 802.11p, etc.). V2X communications may be cellular (Cellular-V2X (C-V2X)) and/or WiFi (e.g., DSRC (Dedicated Short-Range Connection)). The system 100 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc. The UEs 105, 106 may communicate with each other through UE-to-UE sidelink (SL) communications by transmitting over one or more sidelink channels such as a physical sidelink synchronization channel (PSSCH), a physical sidelink broadcast channel (PSBCH), or a physical sidelink control channel (PSCCH). Direct device-to-device communications (without going through a network) may be referred to generally as sidelink communications without limiting the communications to a particular protocol.

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, consumer asset tracking device, navigation device, Internet of Things (IoT) device, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125). The UE 105 may include a single entity or may include multiple entities such as in a personal area network where a user may employ audio, video and/or data I/O (input/output) devices and/or body sensors and a separate wireline or wireless modem.

An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth®, and so on. One or more of a group of UEs utilizing D2D communications may be within a geographic coverage area of a Transmission/Reception Point (TRP) such as one or more of the gNBs 110*a*, 110*b*, and/or the ng-eNB 114. Other UEs in such a group may be outside such geographic coverage areas, or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP. One or more of a group of UEs utilizing D2D communications may be within a geographic coverage area of a TRP. Other UEs in such a group may be outside such geographic coverage areas, or be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110*a* and 110*b*. Pairs of the gNBs 110*a*, 110*b* in the NG-RAN 135 may be connected to one another via one or more other gNBs. Access to the 5G network is provided to the UE 105 via wireless communication between the UE 105 and one or more of the gNBs 110*a*, 110*b*, which may provide wireless communications access to the 5GC 140 on behalf of the UE 105 using 5G. In FIG. 1, the serving gNB for the UE 105 is assumed to be the gNB 110*a*, although another gNB (e.g., the gNB 110*b*) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110*a*, 110*b* in the NG-RAN 135, possibly via one or more other gNBs and/or one or more other ng-eNBs. The ng-eNB 114 may provide LTE wireless access and/or evolved LTE (eLTE) wireless access to the UE 105. One or more of the gNBs 110*a*, 110*b* and/or the ng-eNB 114 may be configured to function as positioning-only beacons which may transmit signals to assist with determining the position of the UE 105 but may not receive signals from the UE 105 or from other UEs.

The gNBs 110*a*, 110*b* and/or the ng-eNB 114 may each comprise one or more TRPs. For example, each sector within a cell of a BS may comprise a TRP, although multiple TRPs may share one or more components (e.g., share a processor but have separate antennas). The system 100 may include macro TRPs exclusively or the system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

Each of the gNBs 110a, 110b and/or the ng-eNB 114 may include a radio unit (RU), a distributed unit (DU), and a central unit (CU). For example, the gNB 110b includes an RU 111, a DU 112, and a CU 113. The RU 111, DU 112, and CU 113 divide functionality of the gNB 110b. While the gNB 110b is shown with a single RU, a single DU, and a single CU, a gNB may include one or more RUs, one or more DUs, and/or one or more CUs. An interface between the CU 113 and the DU 112 is referred to as an F1 interface. The RU 111 is configured to perform digital front end (DFE) functions (e.g., analog-to-digital conversion, filtering, power amplification, transmission/reception) and digital beamforming, and includes a portion of the physical (PHY) layer. The RU 111 may perform the DFE using massive multiple input/multiple output (MIMO) and may be integrated with one or more antennas of the gNB 110b. The DU 112 hosts the Radio Link Control (RLC), Medium Access Control (MAC), and physical layers of the gNB 110b. One DU can support one or more cells, and each cell is supported by a single DU. The operation of the DU 112 is controlled by the CU 113. The CU 113 is configured to perform functions for transferring user data, mobility control, radio access network sharing, positioning, session management, etc. although some functions are allocated exclusively to the DU 112. The CU 113 hosts the Radio Resource Control (RRC), Service Data Adaptation Protocol (SDAP), and Packet Data Convergence Protocol (PDCP) protocols of the gNB 110b. The UE 105 may communicate with the CU 113 via RRC, SDAP, and PDCP layers, with the DU 112 via the RLC, MAC, and PHY layers, and with the RU 111 via the PHY layer.

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110a, 110b and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may communicate directly with the UE 105, e.g., through wireless communications, or directly with the gNBs 110a, 110b and/or the ng-eNB 114. The LMF 120 may support positioning of the UE 105 when the UE 105 accesses the NG-RAN 135 and may support position procedures/methods such as Assisted GNSS (A-GNSS), Observed Time Difference of Arrival (OTDOA) (e.g., Downlink (DL) OTDOA or Uplink (UL) OTDOA), Round Trip Time (RTT), Multi-Cell RTT, Real Time Kinematic (RTK), Precise Point Positioning (PPP), Differential GNSS (DGNSS), Enhanced Cell ID (E-CID), angle of arrival (AoA), angle of departure (AoD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE 105) may be performed at the UE 105 (e.g., using signal measurements obtained by the UE 105 for signals transmitted by wireless nodes such as the gNBs 110a, 110b and/or the ng-eNB 114, and/or assistance data provided to the UE 105, e.g., by the LMF 120). The AMF 115 may serve as a control node that processes signaling between the UE 105 and the 5GC 140, and may provide QoS (Quality of Service) flow and session management. The AMF 115 may support mobility of the UE 105 including cell change and handover and may participate in supporting signaling connection to the UE 105.

The server 150, e.g., a cloud server, is configured to obtain and provide location estimates of the UE 105 to the external client 130. The server 150 may, for example, be configured to run a microservice/service that obtains the location estimate of the UE 105. The server 150 may, for example, pull the location estimate from (e.g., by sending a location request to) the UE 105, one or more of the gNBs 110a, 110b (e.g., via the RU 111, the DU 112, and the CU 113) and/or the ng-eNB 114, and/or the LMF 120. As another example, the UE 105, one or more of the gNBs 110a, 110b (e.g., via the RU 111, the DU 112, and the CU 113), and/or the LMF 120 may push the location estimate of the UE 105 to the server 150.

The GMLC 125 may support a location request for the UE 105 received from the external client 130 via the server 150 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130 via the server 150. The GMLC 125 is shown connected to both the AMF 115 and LMF 120, though may not be connected to the AMF 115 or the LMF 120 in some implementations.

As further illustrated in FIG. 1, the LMF 120 may communicate with the gNBs 110a, 110b and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110a (or the gNB 110b) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP TS 36.355. The LMF 120 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110a, 110b or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110a, 110b or the ng-eNB 114) and/or may be used by the LMF 120 to obtain location related information from the gNBs 110a, 110b and/or the ng-eNB 114, such as parameters defining directional SS or PRS transmissions from the gNBs 110a, 110b, and/or the ng-eNB 114. The LMF 120 may be co-located or integrated with a gNB or a TRP, or may be disposed remote from the gNB and/or the TRP and configured to communicate directly or indirectly with the gNB and/or the TRP.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for the gNBs 110a, 110b, the ng-eNB 114, and/or a WLAN AP. The location measurements may also or instead include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110a, 110b, the ng-eNB 114, or other base stations or APs).

With a network-based position method, one or more base stations (e.g., the gNBs 110a, 110b, and/or the ng-eNB 114) or APs may obtain location measurements (e.g., measurements of RSSI, RTT, RSRP, RSRQ or Time of Arrival (ToA) for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110a, 110b, and/or the ng-eNB 114 to the LMF 120 using NRPPa may include timing and configuration information for directional SS or PRS transmissions and location coordinates. The LMF 120 may provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (or some other position method). In the case of E-CID, the LPP or NPP message may instruct the UE 105 to obtain one or more measurement quantities (e.g., beam ID, beam width, mean angle, RSRP, RSRQ measurements) of directional signals transmitted within particular cells supported by one or more of the gNBs 110a, 110b, and/or the ng-eNB 114 (or supported by some other type of base station such as an eNB or WiFi AP). The UE 105 may send the measurement quantities back to the LMF 120 in an LPP or NPP message (e.g., inside a 5G NAS message) via the serving gNB 110a (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 140. For example, the WLAN may support IEEE 802.11 WiFi access for the UE 105 and may comprise one or more WiFi APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110a, 110b, the ng-eNB 114, the AMF 115, and the LMF 120 may, in some cases, apply instead to other network elements such eNBs, WiFi APs, an MME, and an E-SMLC.

As noted, in some embodiments, positioning functionality may be implemented, at least in part, using the directional SS or PRS beams, sent by base stations (such as the gNBs 110a, 110b, and/or the ng-eNB 114) that are within range of the UE whose position is to be determined (e.g., the UE 105 of FIG. 1). The UE may, in some instances, use the directional SS or PRS beams from a plurality of base stations (such as the gNBs 110a, 110b, the ng-eNB 114, etc.) to compute the UE's position.

Figure 2:
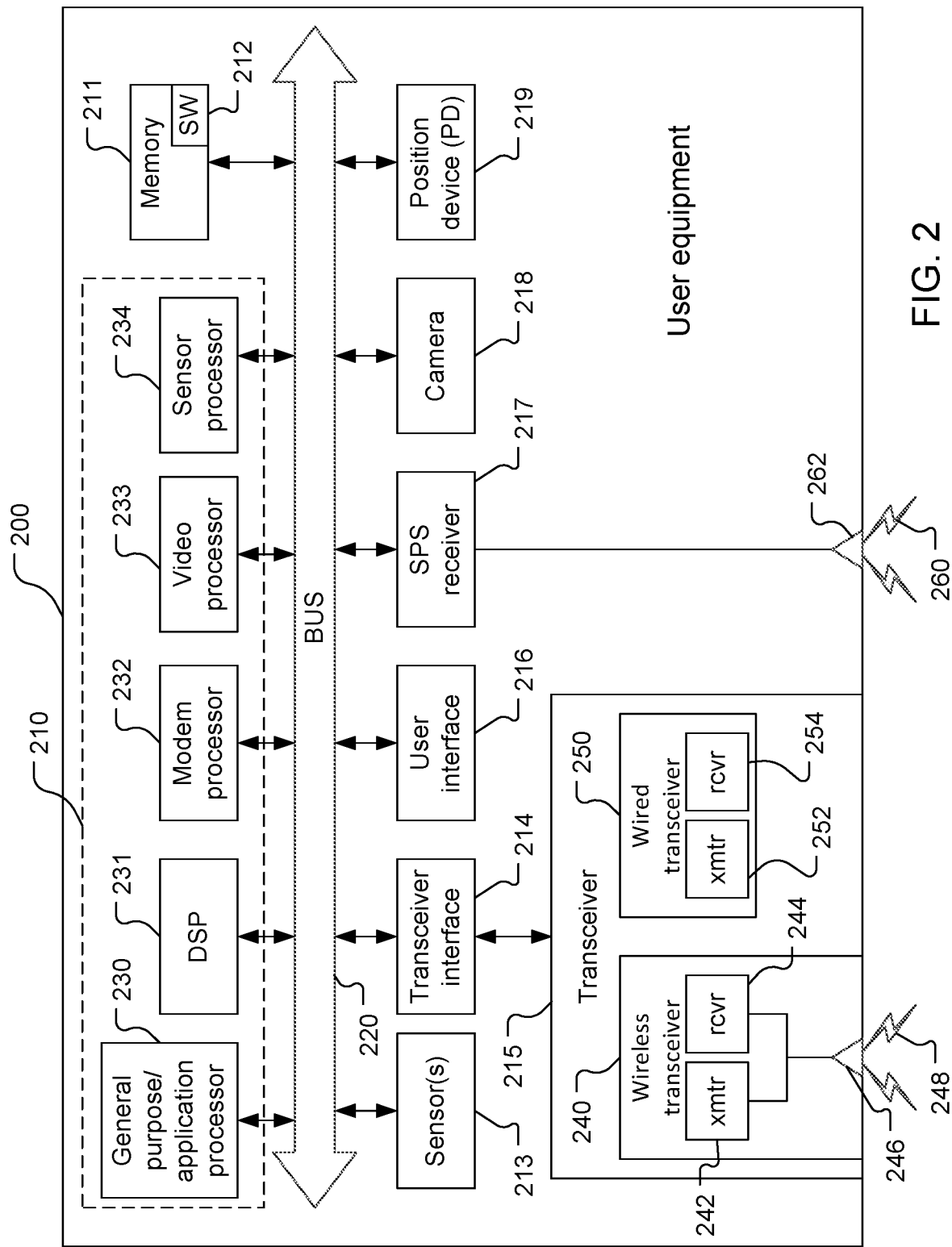
FIG. 2 is a block diagram of components of an example user equipment shown in FIG. 1.

Referring also to FIG. 2, a UE 200 may be an example of one of the UEs 105, 106 and may comprise a computing platform including a processor 210, memory 211 including software (SW) 212, one or more sensors 213, a transceiver interface 214 for a transceiver 215 (that includes a wireless transceiver 240 and a wired transceiver 250), a user interface 216, a Satellite Positioning System (SPS) receiver 217, a camera 218, and a position device (PD) 219. The processor 210, the memory 211, the sensor(s) 213, the transceiver interface 214, the user interface 216, the SPS receiver 217, the camera 218, and the position device 219 may be communicatively coupled to each other by a bus 220 (which may be configured, e.g., for optical and/or electrical communication). One or more of the shown apparatus (e.g., the camera 218, the position device 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for RF (radio frequency) sensing (with one or more (cellular) wireless signals transmitted and reflection(s) used to identify, map, and/or track an object), and/or ultrasound, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 may be a non-transitory storage medium that may include random access memory (RAM), flash memory, disc memory, and/or read-only memory (ROM), etc. The memory 211 may store the software 212 which may be processor-readable, processor-executable software code containing instructions that may be configured to, when executed, cause the processor 210 to perform various functions described herein. Alternatively, the software 212 may not be directly executable by the processor 210 but may be configured to cause the processor 210, e.g., when compiled and executed, to perform the functions. The description herein may refer to the processor 210 performing a function, but this includes other implementations such as where the processor 210 executes software and/or firmware. The description herein may refer to the processor 210 performing a function as shorthand for one or more of the processors 230-234 performing the function. The description herein may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the disclosure, including the claims, and other configurations may be used. For example, an example configuration of the UE may include one or more of the processors 230-234 of the processor 210, the memory 211, and the wireless transceiver 240. Other example configurations may include one or more of the processors 230-234 of the processor 210, the memory 211, a wireless transceiver, and one or more of the sensor(s) 213, the user interface 216, the SPS receiver 217, the camera 218, the PD 219, and/or a wired transceiver.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the general-purpose/application processor 230 and/or the DSP 231. Other configurations, however, may be used to perform baseband processing.

The UE 200 may include the sensor(s) 213 that may include, for example, one or more of various types of sensors such as one or more inertial sensors, one or more magnetometers, one or more environment sensors, one or more optical sensors, one or more weight sensors, and/or one or more radio frequency (RF) sensors, etc. An inertial measurement unit (IMU) may comprise, for example, one or more accelerometers (e.g., collectively responding to acceleration of the UE 200 in three dimensions) and/or one or more gyroscopes (e.g., three-dimensional gyroscope(s)). The sensor(s) 213 may include one or more magnetometers (e.g., three-dimensional magnetometer(s)) to determine orientation (e.g., relative to magnetic north and/or true north) that may be used for any of a variety of purposes, e.g., to support one or more compass applications. The environment sensor(s) may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the general-purpose/application processor 230 in support of one or more applications such as, for example, applications directed to positioning and/or navigation operations.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the LMF 120 regarding the mobility of the UE 200. For example, based on the information obtained/measured by the sensor(s) 213, the UE 200 may notify/report to the LMF 120 that the UE 200 has detected movements or that the UE 200 has moved, and may report the relative displacement/distance (e.g., via dead reckoning, or sensor-based location determination, or sensor-assisted location determination enabled by the sensor(s) 213). In another example, for relative positioning information, the sensors/IMU may be used to determine the angle and/or orientation of the other device with respect to the UE 200, etc.

The IMU may be configured to provide measurements about a direction of motion and/or a speed of motion of the UE 200, which may be used in relative location determination. For example, one or more accelerometers and/or one or more gyroscopes of the IMU may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) and gyroscope(s) taken after this moment in time may be used in dead reckoning to determine present location of the UE 200 based on movement (direction and distance) of the UE 200 relative to the reference location.

The magnetometer(s) may determine magnetic field strengths in different directions which may be used to determine orientation of the UE 200. For example, the orientation may be used to provide a digital compass for the UE 200. The magnetometer(s) may include a two-dimensional magnetometer configured to detect and provide indications of magnetic field strength in two orthogonal dimensions. The magnetometer(s) may include a three-dimensional magnetometer configured to detect and provide indications of magnetic field strength in three orthogonal dimensions. The magnetometer(s) may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a wireless transmitter 242 and a wireless receiver 244 coupled to an antenna 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. The wireless transmitter 242 includes appropriate components (e.g., a power amplifier and a digital-to-analog converter). The wireless receiver 244 includes appropriate components (e.g., one or more amplifiers, one or more frequency filters, and an analog-to-digital converter). The wireless transmitter 242 may include multiple transmitters that may be discrete components or combined/integrated components, and/or the wireless receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. New Radio may use mm-wave frequencies and/or sub-6 GHz frequencies. The wired transceiver 250 may include a wired transmitter 252 and a wired receiver 254 configured for wired communication, e.g., a network interface that may be utilized to communicate with the NG-RAN 135 to send communications to, and receive communications from, the NG-RAN 135. The wired transmitter 252 may include multiple transmitters that may be discrete components or combined/integrated components, and/or the wired receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215. The wireless transmitter 242, the wireless receiver 244, and/or the antenna 246 may include multiple transmitters, multiple receivers, and/or multiple antennas, respectively, for sending and/or receiving, respectively, appropriate signals.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose/application processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The SPS antenna 262 is configured to transduce the SPS signals 260 from wireless signals to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose/application processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose/application processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS (Complementary Metal-Oxide Semiconductor) imager), a lens, analog-to-digital circuitry, frame buffers, etc. Additional processing, conditioning, encoding, and/or compression of signals representing captured images may be performed by the general-purpose/application processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position device (PD) 219 may be configured to determine a position of the UE 200, motion of the UE 200, and/or relative position of the UE 200, and/or time. For example, the PD 219 may communicate with, and/or include some or all of, the SPS receiver 217. The PD 219 may work in conjunction with the processor 210 and the memory 211 as appropriate to perform at least a portion of one or more positioning methods, although the description herein may refer to the PD 219 being configured to perform, or performing, in accordance with the positioning method(s). The PD 219 may also or alternatively be configured to determine location of the UE 200 using terrestrial-based signals (e.g., at least some of the wireless signals 248) for trilateration, for assistance with obtaining and using the SPS signals 260, or both. The PD 219 may be configured to determine location of the UE 200 based on a cell of a serving base station (e.g., a cell center) and/or another technique such as E-CID. The PD 219 may be configured to use one or more images from the camera 218 and image recognition combined with known locations of landmarks (e.g., natural landmarks such as mountains and/or artificial landmarks such as buildings, bridges, streets, etc.) to determine location of the UE 200. The PD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the general-purpose/application processor 230 and/or the DSP 231) may be configured to use to determine motion (e.g., a velocity vector and/or an acceleration vector) of the UE 200. The PD 219 may be configured to provide indications of uncertainty and/or error in the determined position and/or motion. Functionality of the PD 219 may be provided in a variety of manners and/or configurations, e.g., by the general-purpose/application processor 230, the transceiver 215, the SPS receiver 217, and/or another component of the UE 200, and may be provided by hardware, software, firmware, or various combinations thereof.

Figure 3:
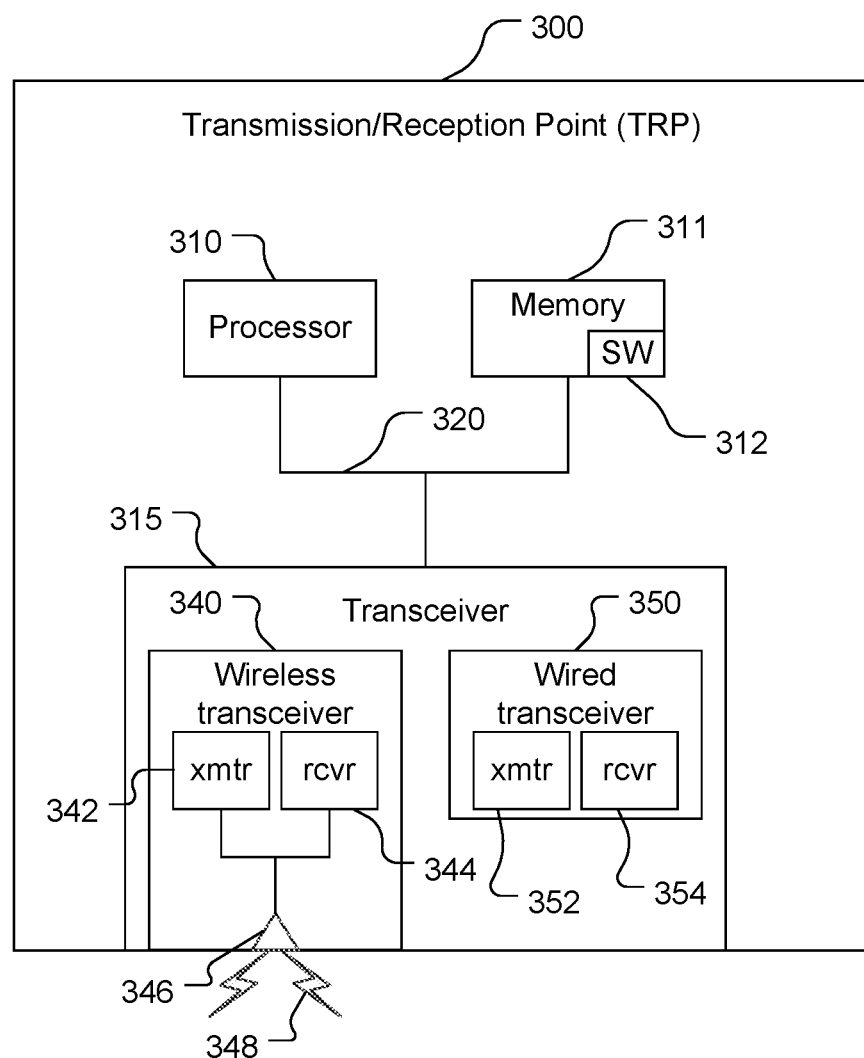
FIG. 3 is a block diagram of components of an example transmission/reception point.

Referring also to FIG. 3, an example of a TRP 300 of the gNBs 110a, 110b and/or the ng-eNB 114 comprises a computing platform including a processor 310, memory 311 including software (SW) 312, and a transceiver 315. The processor 310, the memory 311, and the transceiver 315 may be communicatively coupled to each other by a bus 320 (which may be configured, e.g., for optical and/or electrical communication). One or more of the shown apparatus (e.g., a wireless transceiver) may be omitted from the TRP 300. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 may be a non-transitory storage medium that may include random access memory (RAM)), flash memory, disc memory, and/or read-only memory (ROM), etc. The memory 311 may store the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions.

The description herein may refer to the processor 310 performing a function, but this includes other implementations such as where the processor 310 executes software and/or firmware. The description herein may refer to the processor 310 performing a function as shorthand for one or more of the processors contained in the processor 310 performing the function. The description herein may refer to the TRP 300 performing a function as shorthand for one or more appropriate components (e.g., the processor 310 and the memory 311) of the TRP 300 (and thus of one of the gNBs 110a, 110b and/or the ng-eNB 114) performing the function. The processor 310 may include a memory with stored instructions in addition to and/or instead of the memory 311. Functionality of the processor 310 is discussed more fully below.

The transceiver 315 may include a wireless transceiver 340 and/or a wired transceiver 350 configured to communicate with other devices through wireless connections and wired connections, respectively. For example, the wireless transceiver 340 may include a wireless transmitter 342 and a wireless receiver 344 coupled to one or more antennas 346 for transmitting (e.g., on one or more uplink channels and/or one or more downlink channels) and/or receiving (e.g., on one or more downlink channels and/or one or more uplink channels) wireless signals 348 and transducing signals from the wireless signals 348 to wired (e.g., electrical and/or optical) signals and from wired (e.g., electrical and/or optical) signals to the wireless signals 348. Thus, the wireless transmitter 342 may include multiple transmitters that may be discrete components or combined/integrated components, and/or the wireless receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 350 may include a wired transmitter 352 and a wired receiver 354 configured for wired communication, e.g., a network interface that may be utilized to communicate with the NG-RAN 135 to send communications to, and receive communications from, the LMF 120, for example, and/or one or more other network entities. The wired transmitter 352 may include multiple transmitters that may be discrete components or combined/integrated components, and/or the wired receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the disclosure, including the claims, and other configurations may be used. For example, the description herein discusses that the TRP 300 may be configured to perform or performs several functions, but one or more of these functions may be performed by the LMF 120 and/or the UE 200 (i.e., the LMF 120 and/or the UE 200 may be configured to perform one or more of these functions).

Figure 4:
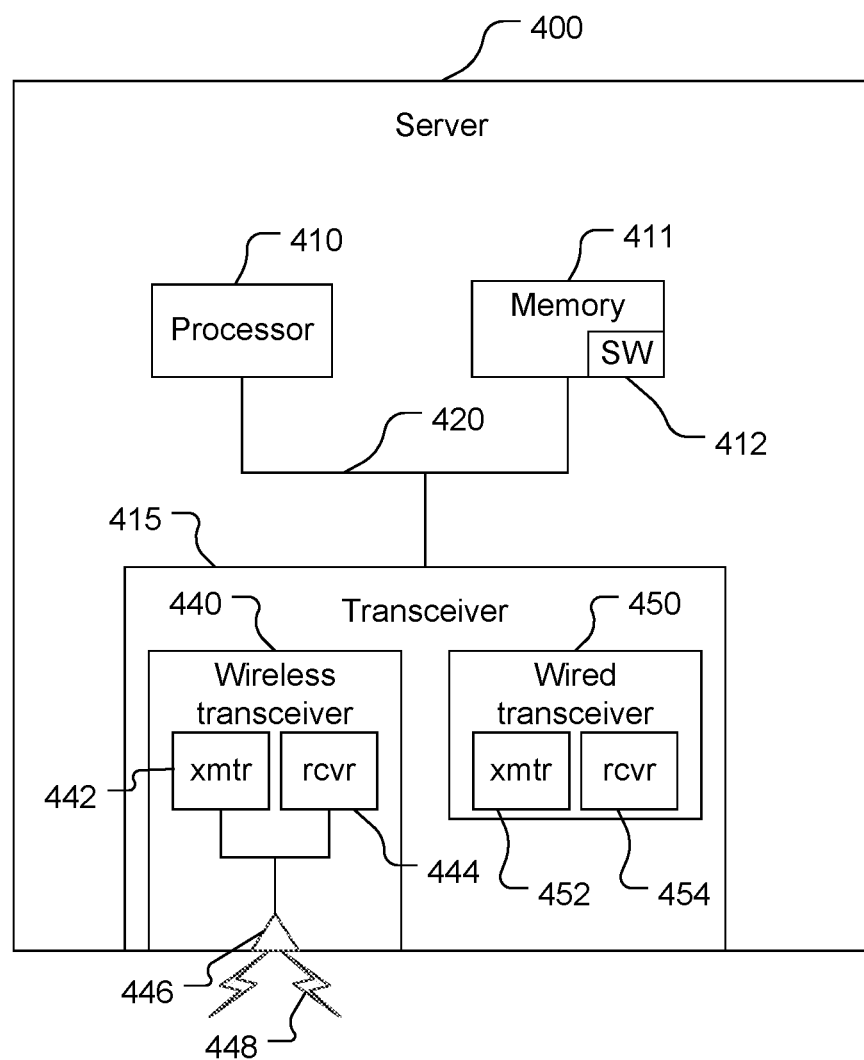
FIG. 4 is a block diagram of components of an example server, various embodiments of which are shown in FIG. 1.

Referring also to FIG. 4, a server 400, of which the LMF 120 may be an example, may comprise a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless transceiver) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 2). The memory 411 may be a non-transitory storage medium that may include random access memory (RAM)), flash memory, disc memory, and/or read-only memory (ROM), etc. The memory 411 may store the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description herein may refer to the processor 410 performing a function, but this includes other implementations such as where the processor 410 executes software and/or firmware. The description herein may refer to the processor 410 performing a function as shorthand for one or more of the processors contained in the processor 410 performing the function. The description herein may refer to the server 400 performing a function as shorthand for one or more appropriate components of the server 400 performing the function. The processor 410 may include a memory with stored instructions in addition to and/or instead of the memory 411. Functionality of the processor 410 is discussed more fully below.

The transceiver 415 may include a wireless transceiver 440 and/or a wired transceiver 450 configured to communicate with other devices through wireless connections and wired connections, respectively. For example, the wireless transceiver 440 may include a wireless transmitter 442 and a wireless receiver 444 coupled to one or more antennas 446 for transmitting (e.g., on one or more downlink channels) and/or receiving (e.g., on one or more uplink channels) wireless signals 448 and transducing signals from the wireless signals 448 to wired (e.g., electrical and/or optical) signals and from wired (e.g., electrical and/or optical) signals to the wireless signals 448. Thus, the wireless transmitter 442 may include multiple transmitters that may be discrete components or combined/integrated components, and/or the wireless receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 450 may include a wired transmitter 452 and a wired receiver 454 configured for wired communication, e.g., a network interface that may be utilized to communicate with the NG-RAN 135 to send communications to, and receive communications from, the TRP 300, for example, and/or one or more other network entities. The wired transmitter 452 may include multiple transmitters that may be discrete components or combined/integrated components, and/or the wired receiver 454 may include multiple receivers that may be discrete components or combined/integrated components. The wired transceiver 450 may be configured, e.g., for optical communication and/or electrical communication.

The description herein may refer to the processor 410 performing a function, but this includes other implementations such as where the processor 410 executes software (stored in the memory 411) and/or firmware. The description herein may refer to the server 400 performing a function as shorthand for one or more appropriate components (e.g., the processor 410 and the memory 411) of the server 400 performing the function.

The configuration of the server 400 shown in FIG. 4 is an example and not limiting of the disclosure, including the claims, and other configurations may be used. For example, the wireless transceiver 440 may be omitted. Also or alternatively, the description herein discusses that the server 400 is configured to perform or performs several functions, but one or more of these functions may be performed by the TRP 300 and/or the UE 200 (i.e., the TRP 300 and/or the UE 200 may be configured to perform one or more of these functions).

Multipath Detection and Mitigation

A UE may receive various types of signals, any one of which may be subject to multipath conditions. Determining whether a signal is subject to multipath conditions, with a UE in a multipath condition with respect to a signal source, may help avoid using measurements of reflected or non-line-of-sight (NLOS) signals to determine a position estimate of a UE.

Figure 5:
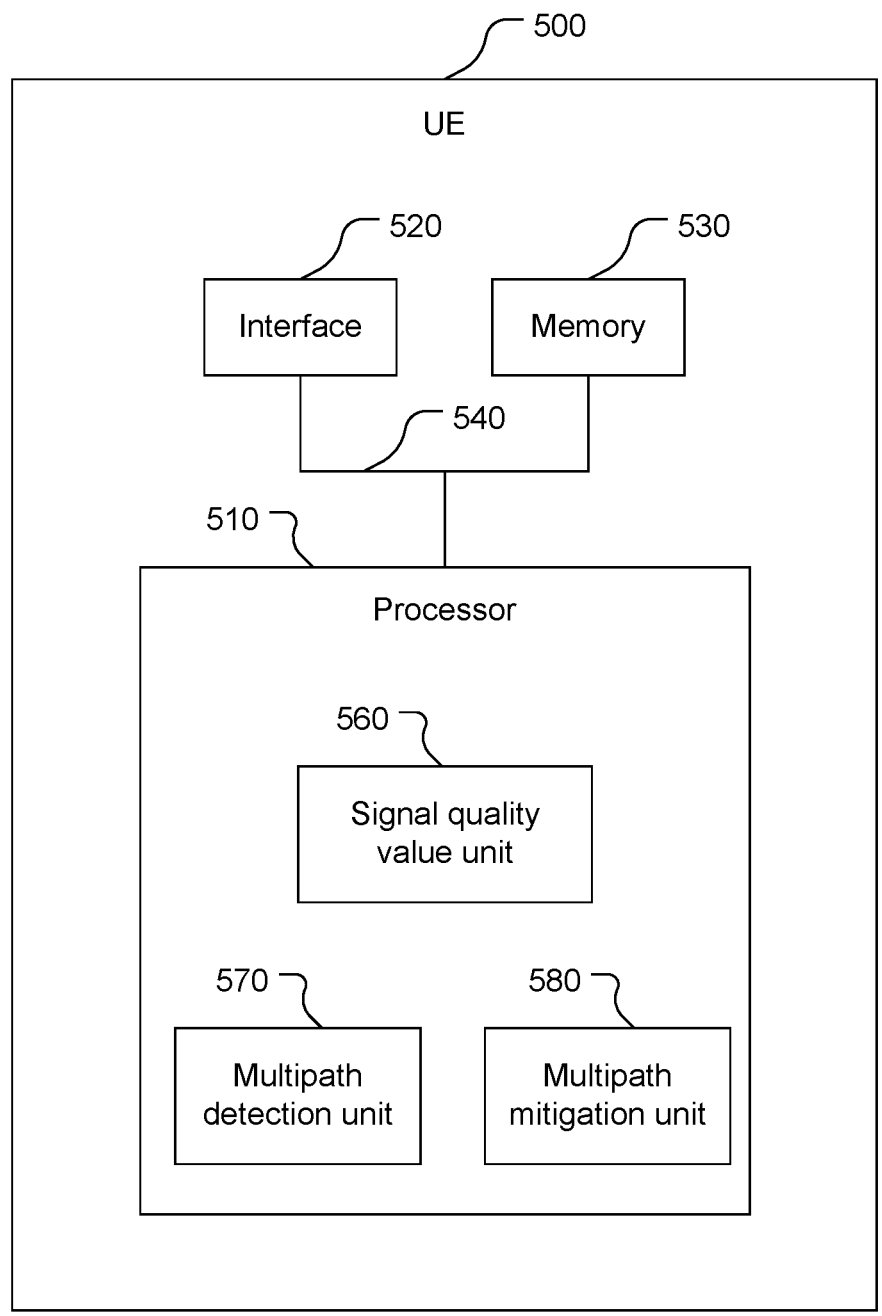
FIG. 5 is a block diagram of an example user equipment.
Figure 6:
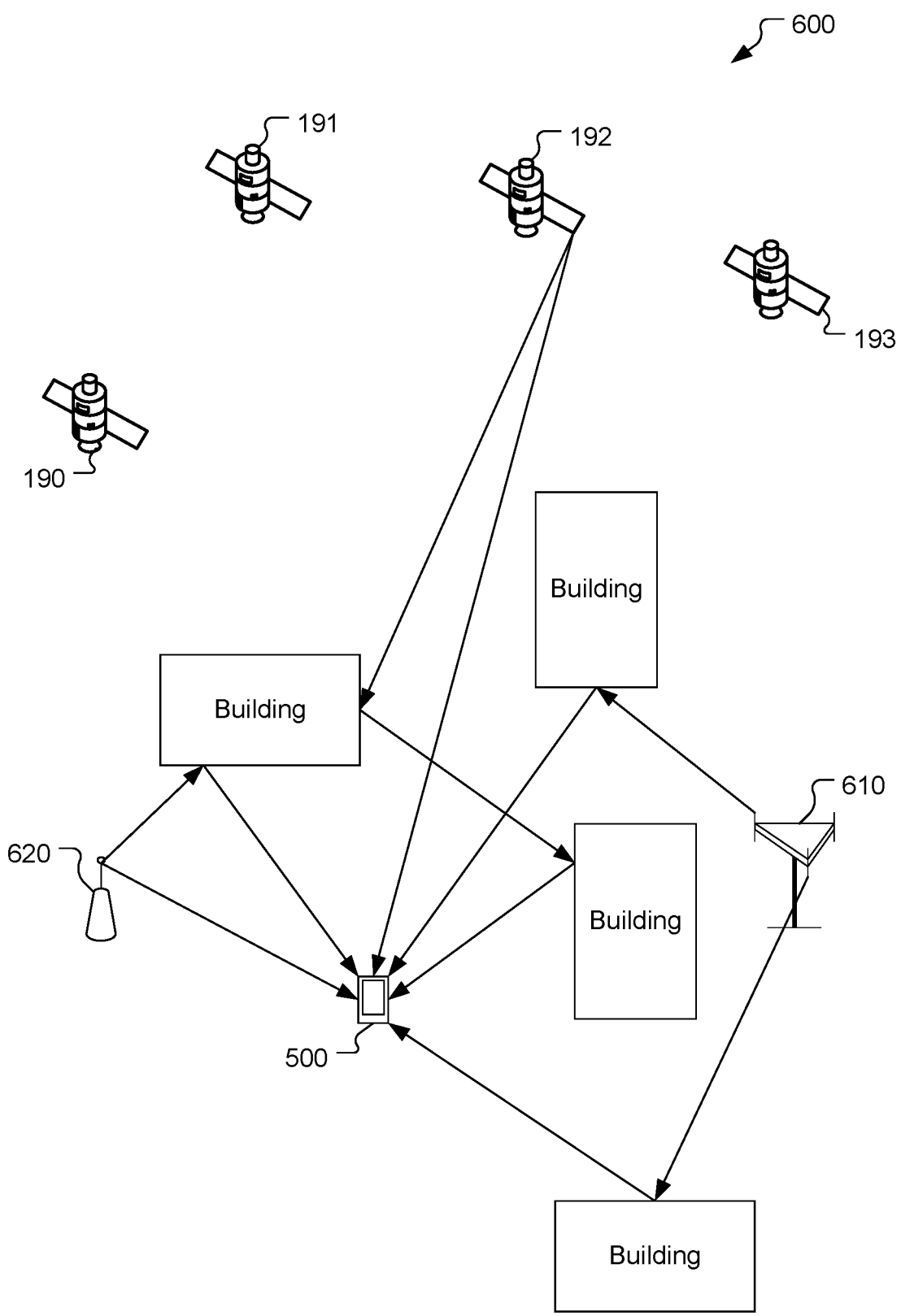
FIG. 6. is a simplified diagram of a navigation environment.

Referring to FIGS. 5 and 6, in a navigation environment 600, a UE 500 may receive RF signals from one or more signal sources, e.g., from one or more of the satellites 190-193, from one or more base stations such as a base station 610, from one or more access points such as an access point 620, and/or from one or more other sources. In the example shown, the UE 500 is in a multipath condition with respect to the satellite 192, the base station 610, and the access point 620, being capable of receiving an RF signal from each of these entities via multiple paths as shown. While only one access point and one base station are shown in FIG. 6, the UE 500 may receive signals from more than one access point and/or from more than one base station, e.g., a sufficient quantity of signal sources in order to determine a position estimate for the UE 500 (e.g., by trilateration and/or another technique). The position estimate may be determined by the UE 500 and/or by another entity, e.g., a server performing a location service.

Referring in particular to FIG. 5, with further reference to FIGS. 1-4, the UE 500 includes a processor 510, an interface 520, and a memory 530 communicatively coupled to each other by a bus 540. The UE 500 may include some or all of the components shown in FIG. 5, and may include one or more other components such as any of those shown in FIG. 2 such that the UE 200 may be an example of the UE 500. The processor 510 may include one or more components of the processor 210. The interface 520 may include one or more of the components of the transceiver 215, e.g., the wireless transmitter 242 and the antenna 246, or the wireless receiver 244 and the antenna 246, or the wireless transmitter 242, the wireless receiver 244, and the antenna 246. Also or alternatively, the interface 520 may include the wired transmitter 252 and/or the wired receiver 254. The interface 520 may include the SPS receiver 217 and the antenna 262. The memory 530 may be configured similarly to the memory 211, e.g., including software with processor-readable instructions configured to cause the processor 510 to perform functions.

The description herein may refer to the processor 510 performing a function, but this includes other implementations such as where the processor 510 executes software (stored in the memory 530) and/or firmware. The description herein may refer to the UE 500 performing a function as shorthand for one or more appropriate components (e.g., the processor 510 and the memory 530) of the UE 500 performing the function. The processor 510 (possibly in conjunction with the memory 530 and, as appropriate, the interface 520) includes a signal quality value unit 560, a multipath detection unit 570, and a multipath mitigation unit 580. The signal quality value unit 560, the multipath detection unit 570, and the multipath mitigation unit 580 are discussed further below, and the description may refer to the processor 510 generally, or the device 500 generally, as performing any of the functions of the strength value unit 560, the multipath detection unit 570, and/or the multipath mitigation unit 580, with the device 500 being configured to perform the functions.

Figure 7:
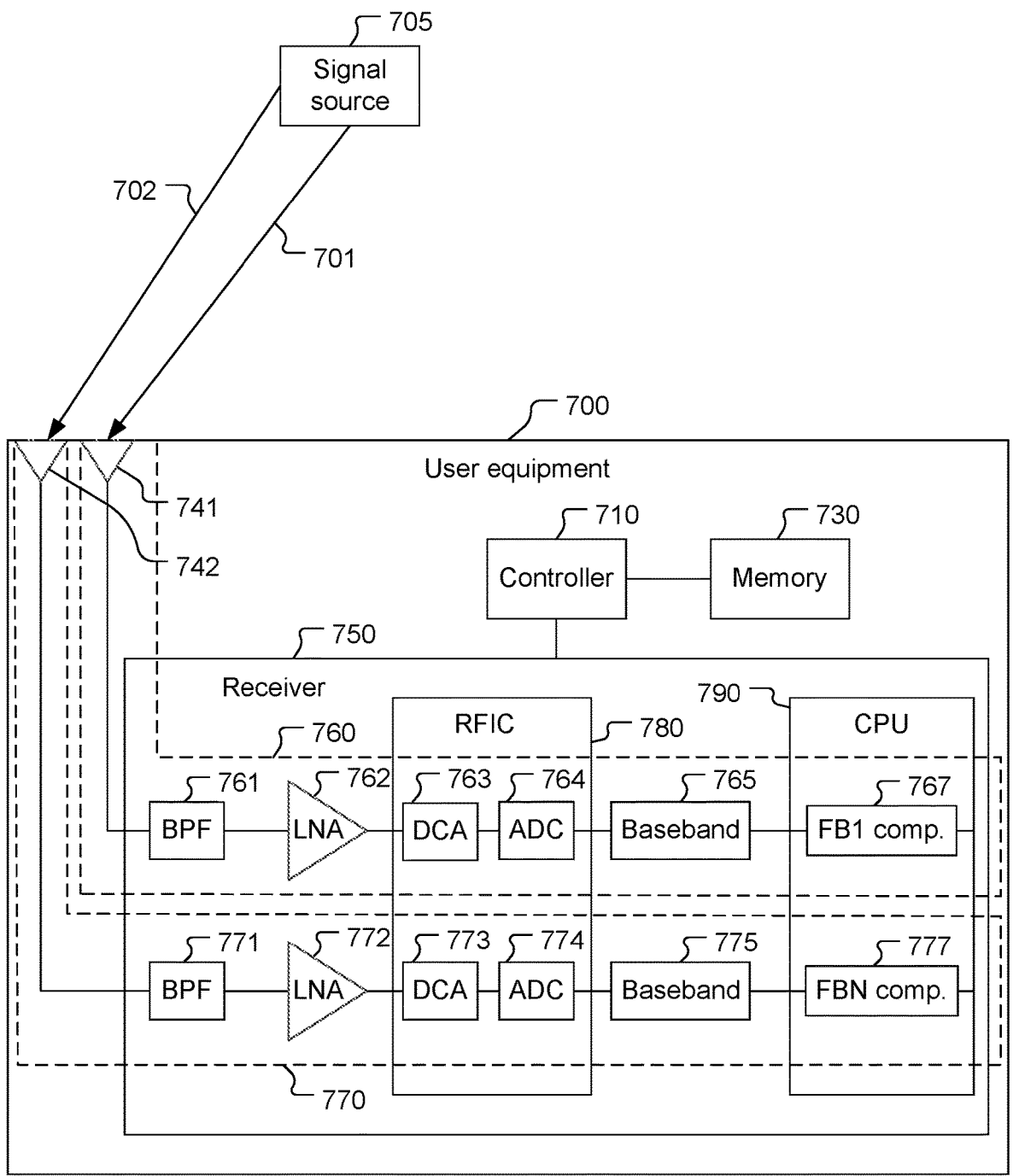
FIG. 7 is a block diagram of an example of the user equipment shown in FIG. 5.

Referring to FIG. 7, with further reference to FIGS. 1-5, a UE 700, which is an example of the UE 500, includes a controller 710, a memory 730, antennas 741, 742, and a receiver 750 communicatively coupled to each other. The memory 730 may be an example of the memory 530. The controller 710 may be implemented by the processor 510 and may be configured to control components of the receiver 750. The antennas 741, 742 may be configured to receive signals 701, 702 (e.g., satellite signals, cellular communication signals, WiFi signals, UWB signals, etc.) of different frequencies (e.g., different satellite frequency bands) from a signal source 705 (e.g., an SV, a base station, an access point, etc.).

The receiver 750 includes multiple receive chains 760, 770 for measuring signals of different frequencies. The signals may be in the same frequency band, in different but overlapping frequency bands (with one or more shared frequencies), or in separate (non-overlapping) frequency bands (with no shared frequency). While two receive chains are shown in FIG. 7, the UE 700 may include more than two receive chains, e.g., for measuring more than two signals of different frequencies. The receive chains 760, 770 may, for example, be configured to measure satellite signals in the L1 and L2/L5 bands, respectively, although this is an example and not limiting of the disclosure as either or both of the receive chains 760, 770 may be configured to measure non-satellite signals and/or to measure signals of other frequencies or frequency bands, and/or other receive chains may be included in the UE 700.

The receive chains 760, 770 may include respective components for measuring signals of different frequencies. The receive chain 760 may include the antenna 741 and the receive chain 770 may include the antenna 742. The receive chain 760 may include a BPF 761 (bandpass filter), an LNA 762 (low-noise amplifier), a DCA 763 (Digital Controlled Amplifier for down-conversion, signal conditioning/filtering, and amplification), an ADC 764 (analog-to-digital converter), a baseband block 765, and a computational block 767. The BPF 761 is configured to pass signals of frequencies within a desired frequency band with little if any attenuation, and to significantly attenuate signals of frequencies outside the desired frequency band of the BPF 761. The LNA 762 is configured to amplify signals passed by the BPF 761. The DCA 763 may be configured to down convert the analog amplified signals output by the LNA 762 to a baseband frequency, to perform signal conditioning and/or filtering (e.g., anti-aliasing filtering), and amplification in addition to the amplification by the LNA 762. The ADC 764, which here is a portion of an RFIC 780 (Radio Frequency Integrated Circuit), is configured to convert the analog signals output by the DCA 763 into digital signals. The baseband block 765 may be configured to perform signal processing, e.g., correlating the digital signals output by the ADC 764 with respective reference pseudorandom signals (e.g., Gold codes) by integrating the signals (e.g., for 1 ms) and dumping the integrated signals for further processing to determine whether the correlation results have sufficient energy to indicate a true signal. The computational block 767, which here is a portion of a CPU 790 (Central Processing Unit), may be configured to perform one or more computations on the signals output by the baseband block 765 to determine one or more signal parameters (e.g., pseudorange, SNR (signal-to-noise ratio), CN0 (carrier-to-noise-density ratio), Doppler, carrier phase, etc.). The computational block 767 may comprise a portion of the CPU 790 for performing computations for the receive chain 760, namely corresponding to signals in the desired frequency band of the BPF 761. Thus, the computational block 767 is shown as being for computation for frequency band 1 (FB1). The CPU 790 may be a portion of the processor 510. The receive chain 770 includes a BPF 771, an LNA 772, a DCA 773, an ADC 774, a baseband block 775, and a computational block 777. The BPF 771 is configured to pass signals of frequencies within a desired frequency band with little if any attenuation, and to significantly attenuate signals of frequencies outside the desired frequency band of the BPF 771. The LNA 772, DCA 773, ADC 774, baseband block 775, and computational block 777 may be configured similarly to the LNA 762, DCA 763, ADC 764, baseband block 765, and computational block 767, but configured, as appropriate, for processing signals corresponding to signals of the desired frequency band of the BPF 771. Thus, the computational block 777 is shown as being for computation for frequency band N (FBN), as there may be N receive chains, with N being an integer of two or greater.

The signal quality value unit 560 may be configured to determine one or more measured values based on signal quality of the received signals of different frequencies. For example, the signal quality value unit 560 may be configured to determine a measure of signal strength relative to noise. For example, the signal quality value unit 560 may be configured to determine a signal-to-noise ratio (SNR) for each of multiple signals of different frequencies, e.g., the signals received by the antennas 741, 742 and the receive chains 760, 770. The signal quality value unit 560 may be configured to determine CN0 for satellite signals.

The signal quality value unit 560 may be configured to determine expected signal quality values. For example, the signal quality value unit 560 may be configured to determine an expected signal strength value based on a calculation using device/component characteristics, e.g., based on calculation of a link budget. The signal quality value unit 560 may, for example, be configured to consider RF loss, antenna gain (of the antennas 741, 742 and the antenna(s) of the signal source 701 transmitting the signals 701, 702), geometry, and transmission power of the signal source 705 to determine link budgets for the signals 701, 702 for the signal source 705 for the case without any signal interference (e.g., line-of-sight (LOS)). Each link budget provides an expected signal strength value (e.g., SNR, CN0, etc.) as a baseline.

Actual signal quality value measurements may be used to determine the expected signal quality values. Depending on the environment near the UE 700, actual signal propagation conditions may cause an offset between an actual signal quality value (e.g., actual SNR or actual CN0 or actual signal strength (e.g., RSSI)) and an expected signal quality value (e.g., expected SNR or expected CN0 or expected signal strength (e.g., RSSI)). Thus, instead of or in addition to calculating an expected signal quality value (e.g., CN0 from link budget), actual measurements of signal quality may be made to determine the expected signal quality. For example, the signal quality value unit 560 may determine an average of actual signal quality measures over time. For example, the signal quality value unit 560 may determine expected CN0 for the L1 band as an average of measured CN0 values over time as follows $$CN0_{expected}^{L1} = \overline{CN0_{measured}^{L1}(t_n)} \qquad (1)$$

where $t_n$ is the $n^{th}$ time instance. The signal quality value unit 560 may provide on-device learning by implementing machine learning (e.g., a neural network) to determine an expected signal quality measure (e.g., CN0) based on empirical statistics for the UE 700 in LOS conditions. The expected signal quality value may also or alternatively be determined by another entity (i.e., other than the UE 700), e.g., the server 400. For example, the server 400 may receive indications of measurements from the UE 700 and/or one or more other devices to determine (e.g., through machine learning) the expected signal quality value. While examples are shown for satellite signals, and in particular for satellite signals in the L1, L2, and L5 frequency bands, these are examples and not limiting of the disclosure as other signal types (other than SV signals) and/or other signal frequencies may be used.

Based on the expected signal quality value (e.g., calculated based on known device characteristics or determined empirically), a signal quality residual may be determined. For example, the multipath detection unit 570 may calculate signal quality value residual, e.g., a CN0 residual, for each epoch t as follows $$CN0_{residual}^{Li}(t) = CN0_{expected}^{Li} - CN0_{measured}^{Li}(t) \qquad (2)$$

where Li=L1, L2, or L5. Signal quality value residuals may be calculated similarly for other signal quality values (e.g., SNR, signal strength, etc.).

Calculations may be made for signal quality values for different received signals of different frequencies. For example, the multipath detection unit 570 may calculate differences between the signal quality values for different signals. Continuing the SV examples with signals in the L1, L2, and L5 bands, signal quality value differences for CN0 measurements may be determined as follows $$CN0_{diff}^{L1-L2}(t) = CN0_{measured}^{L1}(t) - CN0_{measured}^{L2}(t) \qquad (3)$$

$$CN0_{diff}^{L1-L5}(t) = CN0_{measured}^{L1}(t) - CN0_{measured}^{L5}(t) \qquad (4)$$

$$CN0_{diff}^{L2-L5}(t) = CN0_{measured}^{L2}(t) - CN0_{measured}^{L5}(t) \qquad (5)$$

The multipath detection unit 570 may detect a multipath condition based on the signal quality residuals and/or comparisons of signal quality values for signals of different frequencies. For example, the multipath detection unit 570 may determine a standard deviation of multiple signal quality value residuals corresponding to different times and/or may determine comparisons of different-frequency signals. It has been found that the standard deviation of signal quality value residuals, e.g., CN0 residuals, may be larger under a multipath condition than the standard deviation of signal quality value residuals while not under a multipath condition. It has also been found that signal quality values of signals of different frequencies may differ more from each other under a multipath condition than while not under a multipath condition. For example, the CN0 differences shown in Equations (3)-(5), measured by the UE 700 from an SV as the signal source 705, may differ by greater amounts under a multipath condition (of the UE 700 relative to the signal source 705) than while not under a multipath condition (of the UE 700 relative to the signal source 705).

The multipath detection unit 570 may be configured to detect a multipath condition based on standard deviation of a signal quality value exceeding a threshold. For example, the multipath detection unit 570 may be configured to determine whether the standard deviation of a signal quality value corresponding to two or more signals of different frequencies exceeds a threshold for a standard deviation of the signal quality value for the different frequencies while a signal source and signal receiver are not under a multipath condition. For example, the multipath detection unit 570 may be configured to whether the following residual consistency check is true $$\text{std}([CN0_{residual}^{L1}(t), CN0_{residual}^{L2}(t), CN0_{residual}^{L3}(t)]) > TH \qquad (6)$$

where TH is a threshold. If the standard deviation of the CN0 values corresponding to signals in the L1, L2, or L5 frequency bands, respectively, exceeds the threshold TH, then the residual consistency check (6) is true, and the multipath detection unit 570 may conclude that the UE 700 is in a multipath condition with respect to the signal source 705. The threshold TH may be empirically determined, e.g., based on on-device (on the UE 700) learning results, e.g., residual analysis under multipath and non-multipath conditions. Also, while the residual consistency check (6) includes CN0 values corresponding to three signals, the standard deviation of other quantities of signals (e.g., two, four or more) may be determined and used to detect a multipath condition.

The multipath detection unit 570 may be configured to detect a multipath condition based on signal quality values corresponding to signals of different frequencies differing by more than a respective threshold. For example, the multipath detection unit 570 may be configured to whether any of the following inequalities are true $$CN0_{diff}^{L1-L2}(t) > TH_1 \qquad (7)$$

$$CN0_{diff}^{L1-L5}(t) > TH_2 \qquad (8)$$

$$CN0_{diff}^{L2-L5}(t) > TH_3 \qquad (9)$$

where $TH_1$, $TH_2$, and $TH_3$ are thresholds that may be determined based on on-device learning results and may be different from each other (or two or more of these thresholds may be the same). The multipath detection unit 570 may be configured to conclude that a multipath condition exists if any comparison of a signal quality measure of signals corresponding to different frequencies exceeds a threshold of such a comparison under non-multipath conditions, e.g., if any of the inequalities (7)-(9) is true. As another example, the multipath detection unit 570 may be configured to conclude that a multipath condition exists if two or more of such comparisons exceed respective thresholds, e.g., if two or more of the inequalities (7)-(9) are true. As another example, the multipath detection unit 570 may be configured to conclude that a multipath condition exists if all such comparisons exceed respective thresholds, e.g., if all of the inequalities (7)-(9) are true. The thresholds $TH_1$, $TH_2$, $TH_3$ may be empirically determined, e.g., based on on-device (on the UE 700) learning results, e.g., based on machine learning.

While the discussion has focused on the UE 700 determining signal quality values, expected signal quality values, and thresholds for determining whether a multipath condition exists, one or more of these may also or alternatively be determined by another entity such as the server 400. For example, the server 400 may collect appropriate information (e.g., measurements) to determine one or more measurements, may determine one or more expected signal quality values, may determine one or more signal quality residuals, and/or may make one or more comparisons of signal quality values corresponding to signals of different frequencies. The server 400 may be configured to determine whether the UE 700 is in a multipath condition with respect to the signal source 705, e.g., by performing one or more of the techniques discussed above.

The multipath detection unit 570 may be configured to detect a multipath condition based on a combination of techniques discussed, e.g., based on the standard deviation of a signal quality value exceeding a threshold and signal quality values corresponding to signals of different frequencies differing by more than a respective threshold. For example, the multipath detection unit 570 may be configured to conclude that a multipath condition exists based on the standard deviation of a signal quality value corresponding to two or more signals exceeding a threshold for a standard deviation of the signal quality value while a signal source and signal receiver are not under a multipath condition, and one or more comparisons of a signal quality measure of signals corresponding to different frequencies exceeding one or more respective thresholds, e.g., based on such comparison(s) under non-multipath conditions.

The multipath mitigation unit 580 may be configured to take one or more actions to mitigate the effect(s) of signal measurement(s) under a multipath condition. For example, based on the multipath detection unit 570 determining that a multipath condition exists between the UE 700 and the signal source 705, the multipath mitigation unit 580 may cause a positioning engine of the UE 700 to ignore or de-weight one or more measurements of one or more signals received by the UE 700 from the signal source 705. For example, the multipath mitigation unit 580 may cause a positioning engine to ignore or de-weight one or more measurements based on one or more signals of the same frequency that resulted in the determination of the multipath condition. As another example, the multipath mitigation unit 580 may cause a positioning engine to ignore or de-weight any measurements from the signal source 705, e.g., regardless of the frequency of the signal measured and the frequency(ies) of the signal measurement(s) resulting in the multipath condition conclusion. The multipath mitigation unit 580 may send an indication of the multipath condition conclusion to another entity, e.g., to the server 400. The indication may include a location (if known) of the UE 700, e.g., based on other non-ignored, non-de-weighted measurements, and/or based on one or more other techniques (e.g., E-CID). Multiple indications of multipath condition may be crowdsourced, e.g., to identify a region of multipath condition for a particular signal source. A mobile device may be provided with an indication of the identified region and the corresponding signal source such that the mobile device may ignore or de-weight one or more measurements based on one or more signals received from the signal source while the mobile device is in the identified region. The mobile device may be provided with an indication of which signal(s) to ignore and/or which signal measurement(s) (e.g., corresponding to which signal(s)) to ignore or de-weight.

It has been found that using one or more techniques discussed herein has a high reliability rate of multipath condition identification, and can improve position estimation accuracy. Experimental results have shown that large double different pseudorange residuals strongly correlated to identification of multipath conditions by techniques discussed herein. Further, experimental results have shown that by ignoring or de-weighting one or more signals or one or more measurements of one or more signals corresponding to a signal source under a multipath condition with respect to a signal receiver, position estimate accuracy is improved (e.g., horizontal error decreased). Such position estimate accuracy improvement may help operation of a variety of devices, e.g., smartphones, wearables, vehicles (e.g., for autonomous driving, collision avoidance, navigation, etc.), connected smart systems (e.g., IoT devices), unoccupied aerial vehicles, non-terrestrial network devices, other RF-based PNT systems, etc.

Figure 8:
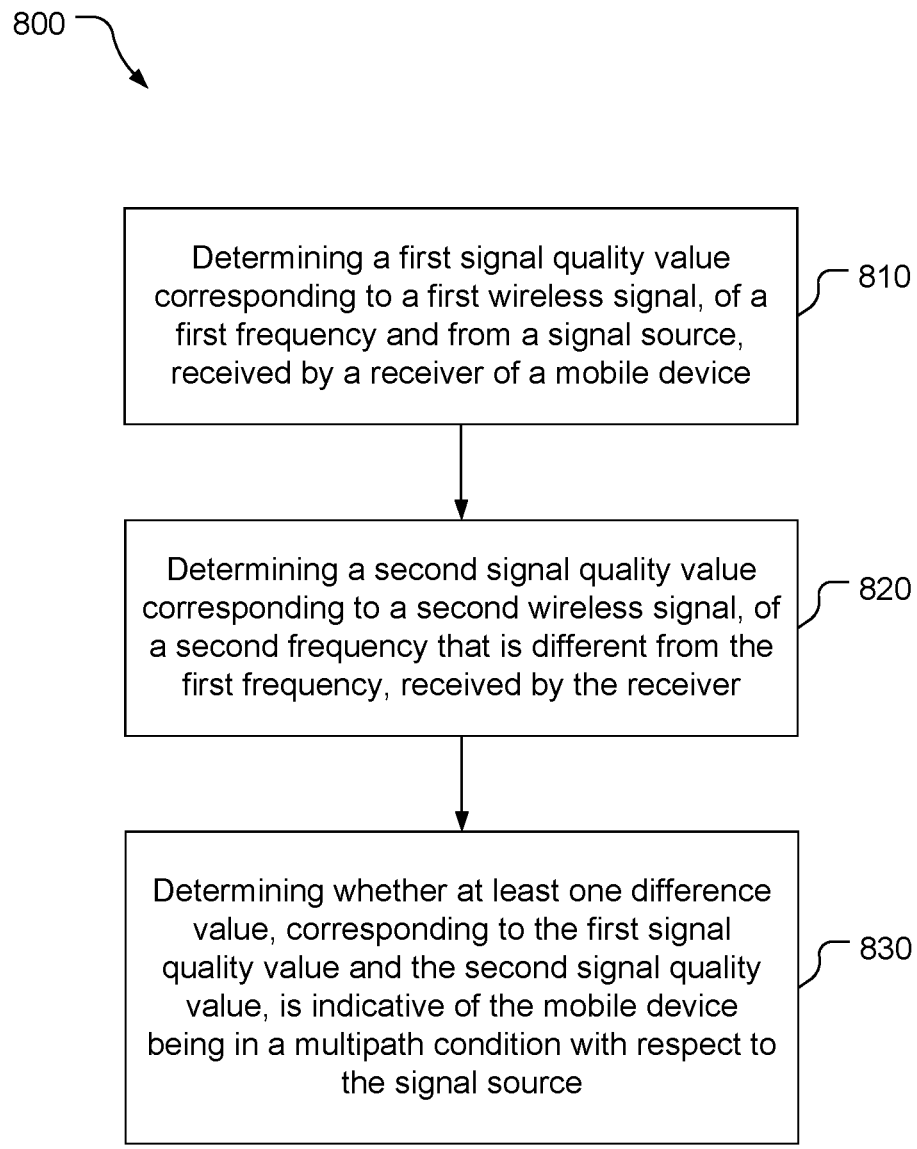
FIG. 8 is a block diagram of a multipath condition detection method.

Referring to FIG. 8, with further reference to FIGS. 1-7, a multipath condition detection method 800 includes the stages shown. The method 800 is, however, an example and not limiting. The method 800 may be altered, e.g., by having one or more stages added, removed, rearranged, combined, performed concurrently, and/or having one or more single stages split into multiple stages.

At stage 810, the method 800 includes determining a first signal quality value corresponding to a first wireless signal, of a first frequency and from a signal source, received by a receiver of a mobile device. For example, the signal quality value unit 560 may determine a measure of signal quality corresponding to a wireless RF signal, e.g., the signal 701. The signal quality value unit 560 may, for example, determine a signal strength value, an SNR value, and/or a CN0 value. Also or alternatively, the server 400 may determine the measure of signal quality, e.g., based on information provided by the UE 700. The processor 510, possibly in combination with the memory 530, in combination with the interface 520 may comprise means for determining the first signal quality value. The processor 410, possibly in combination with the memory 411, in combination with the wired receiver 454 and/or the wireless receiver 444 and the antenna 442, may comprise means for determining the first signal quality value.

At stage 820, the method 800 includes determining a second signal quality value corresponding to a second wireless signal, of a second frequency that is different from the first frequency, received by the receiver. For example, the signal quality value unit 560 may determine a measure of signal quality corresponding to another wireless RF signal of a different frequency, e.g., the signal 702. The signal quality value unit 560 may, for example, determine a signal strength value, an SNR value, and/or a CN0 value. Also or alternatively, the server 400 may determine the measure of signal quality, e.g., based on information provided by the UE 700. The processor 510, possibly in combination with the memory 530, in combination with the interface 520 may comprise means for determining the second signal quality value. The processor 410, possibly in combination with the memory 411, in combination with the wired receiver 454 and/or the wireless receiver 444 and the antenna 442, may comprise means for determining the second signal quality value.

At stage 830, the method 800 includes determining whether at least one difference value, corresponding to the first signal quality value and the second signal quality value, is indicative of the mobile device being in a multipath condition with respect to the signal source. For example, the multipath detection unit 570 may determine whether the UE 700 is in a multipath condition relative to the signal source 705 by evaluating the residual consistency check (6) and/or one or more of the inequalities (7)-(9) and/or one or more inequalities for another signal quality value (e.g., SNR, signal strength, etc.). If one or more of the inequalities is true (e.g., any of the inequalities or a combination of two or more of the inequalities), then the multipath detection unit 570 may conclude that the multipath condition is present. The processor 510, possibly in combination with the memory 530, may comprise means for determining whether the at least one difference value is indicative of the mobile device being in the multipath condition with respect to the signal source. The processor 410, possibly in combination with the memory 411, may comprise means for determining whether the at least one difference value is indicative of the mobile device being in the multipath condition with respect to the signal source.

Implementations of the method 800 may include one or more of the following features. In an example implementation, the first signal quality value is a first carrier-to-noise density ratio and the second signal quality value is a second carrier-to-noise density, and wherein determining whether the at least one difference value is indicative of the mobile device being in the multipath condition with respect to the signal source comprises: determining a first carrier-to-noise density residual value as a first difference between the first signal quality value and a first expected signal quality value corresponding to the first wireless signal for a line-of-sight condition between the mobile device and the signal source; determining a second carrier-to-noise density residual value as a second difference between the second signal quality value and a second expected signal quality value corresponding to the second wireless signal for the line-of-sight condition between the mobile device and the signal source; and determining whether a relationship of the first carrier-to-noise density residual value and the second carrier-to-noise density residual value is indicative of the mobile device being in the multipath condition with respect to the signal source. For example, the multipath detection unit 570 may evaluate signal quality using two or more of Equations (3)-(5) for multiple signals of different frequencies and determine whether a standard deviation of the signal quality values exceeds a threshold, e.g., as shown in residual consistency check (6) for an example of CN0 values for signals of each of three different frequencies. The processor 510, possibly in combination with the memory 530, and/or the processor 410, possibly in combination with the memory 411, may comprise means for determining the first carrier-to-noise density residual value, means for determining the second carrier-to-noise density residual value, and means for determining whether the relationship of the first carrier-to-noise density residual value and the second carrier-to-noise density residual value is indicative of the mobile device being in the multipath condition with respect to the signal source. In a further example implementation, determining whether the relationship of the first carrier-to-noise density residual value and the second carrier-to-noise density residual value is indicative of the mobile device being in the multipath condition with respect to the signal source comprises determining whether a standard deviation of the first carrier-to-noise density residual value and the second carrier-to-noise density residual value exceeds a threshold. For example, the multipath detection unit 570 may evaluate signal quality using two or more of Equations (3)-(5) for multiple signals of different frequencies and determine whether a standard deviation of the signal quality values exceeds a threshold, e.g., as shown in residual consistency check (6) for an example of CN0 values for signals of each of three different frequencies. The processor 510, possibly in combination with the memory 530, and/or the processor 410, possibly in combination with the memory 411, may comprise means for determining whether a standard deviation of the first carrier-to-noise density residual value and the second carrier-to-noise density residual value exceeds a threshold.

Also or alternatively, implementations of the method 800 may include one or more of the following features. In an example implementation, the first signal quality value is a first signal-to-noise ratio and the second signal quality value is a second signal-to-noise ratio, and wherein determining whether the at least one difference value is indicative of the multipath condition of the mobile device with respect to the signal source comprises: determining a first signal-to-noise ratio residual value as a first difference between the first signal quality value and a first expected signal quality value corresponding to the first wireless signal for a line-of-sight condition between the mobile device and the signal source; determining a second signal-to-noise ratio residual value as a second difference between the second signal quality value and a second expected signal quality value corresponding to the second wireless signal for the line-of-sight condition between the mobile device and the signal source; and determining whether a relationship of the first signal-to-noise ratio residual value and the second signal-to-noise ratio residual value is indicative of the multipath condition of the mobile device with respect to the signal source. For example, the multipath detection unit 570 may evaluate signal quality using two or more of Equations (3)-(5), modified for SNR instead of CN0, for multiple signals of different frequencies and determine whether a standard deviation of the signal quality values exceeds a threshold, e.g., as shown in residual consistency check (6), with SNR substituted CN0, for values for signals of each of three different frequencies. The processor 510, possibly in combination with the memory 530, and/or the processor 410, possibly in combination with the memory 411, may comprise means for determining the first SNR residual value, means for determining the SNR residual value, and means for determining whether the relationship of the first SNR residual value and the second SNR residual value is indicative of the mobile device being in the multipath condition with respect to the signal source. In a further example implementation, determining whether the relationship of the first signal-to-noise ratio residual value and the second signal-to-noise ratio residual value is indicative of the multipath condition of the mobile device with respect to the signal source comprises determining whether a standard deviation of the first signal-to-noise ratio residual value and the second signal-to-noise ratio residual value exceeds a threshold. For example, the multipath detection unit 570 may evaluate signal quality using two or more of Equations (3)-(5), with SNR substituted for CN0, for multiple signals of different frequencies and determine whether a standard deviation of the signal quality values exceeds a threshold, e.g., as shown in residual consistency check (6) with SNR substituted for CN0. The processor 510, possibly in combination with the memory 530, and/or the processor 410, possibly in combination with the memory 411, may comprise means for determining whether a standard deviation of the first SNR residual value and the second SNR residual value exceeds a threshold.

Also or alternatively, implementations of the method 800 may include one or more of the following features. In an example implementation, determining whether the at least one difference value is indicative of the multipath condition of the mobile device with respect to the signal source comprises determining whether a difference between the first signal quality value and the second signal quality value exceeds a threshold. For example, the multipath detection unit 570 and/or the processor 410 may determine whether one or more of the inequalities (7)-(9) is true, or one or more inequalities of a signal quality value other than CN0. The processor 510, possibly in combination with the memory 530, and/or the processor 410, possibly in combination with the memory 411, may comprise means for determining whether a difference between the first signal quality value and the second signal quality value exceeds a threshold. In a further example implementation, the method includes determining a third signal quality value corresponding to a third wireless signal, of a third frequency that is different from the first frequency and the second frequency, received by the receiver, and: the difference between the first signal quality value and the second signal quality value is a first difference; the threshold is a first threshold; and determining whether the at least one difference value is indicative of the multipath condition of the mobile device with respect to the signal source comprises: determining a second difference comprising a difference between the first signal quality value and the second signal quality value, or a difference between the second signal quality value and the third signal quality value; and determining whether the first difference exceeds the first threshold and the second difference exceeds a second threshold. For example, the signal quality value unit 560 may determine a signal quality value of a third signal of a third frequency, and the multipath detection unit 570 may determine whether two or more of the inequalities (7)-(9) (or two or more similar inequalities for signal quality values other than CN0) are true. The processor 510, possibly in combination with the memory 530, in combination with the interface 520 may comprise means for determining the third signal quality value. The processor 410, possibly in combination with the memory 411, in combination with the wired receiver 454 and/or the wireless receiver 444 and the antenna 442, may comprise means for determining the third signal quality value. The processor 510, possibly in combination with the memory 530, and/or the processor 410, possibly in combination with the memory 411, may comprise means for determining the second difference and means for determining whether the first difference exceeds the first threshold and the second difference exceeds a second threshold.

Also or alternatively, implementations of the method 800 may include one or more of the following features. In an example implementation, the first signal quality value is a carrier-to-noise density ratio. In another example implementation, the first signal quality value is a signal-to-noise ratio. In another example implementation, the method 800 includes de-weighting or ignoring a positioning measurement corresponding to a positioning signal corresponding to the signal source based on the at least one difference value being indicative of the multipath condition of the mobile device with respect to the signal source. For example, the multipath mitigation unit 580 may ignore or de-weight one or more measurements corresponding to one or more signals from the signal source 705 based on the signal source 705 being in a multipath condition relative to the UE 700. The measurement(s) may be ignored or de-weighted when determining a position estimate for the UE 700 and/or when reporting measurement(s), e.g., to the server 400. The processor 510, possibly in combination with the memory 530 (and possibly in combination with the interface 520, e.g., the wireless transmitter 242 and the antenna 246), and/or the processor 410, possibly in combination with the memory 411, may comprise means for determining the second difference and means for de-weighting or ignoring a positioning measurement. In a further example implementation, the method includes determining a position estimate for the mobile device while de-weighting or ignoring the positioning measurement corresponding to the positioning signal corresponding to the signal source. For example, the UE 700 and/or the server 400 may determine a position estimate for the UE 700 while ignoring or de-weighting a measurement of a positioning signal from the signal source 705 based on the UE 700 and the signal source 705 being in a multipath condition. The processor 510, possibly in combination with the memory 530, and/or the processor 410, possibly in combination with the memory 411, may comprise means for determining the position estimate. In a further example implementation, the positioning measurement is a first positioning measurement and the positioning signal is a first positioning signal, and wherein determining the position estimate for the mobile device comprises determining the position estimate for the mobile device without de-weighting or ignoring a second positioning measurement corresponding to a second positioning signal, of a different frequency than the first positioning signal, corresponding to the signal source. For example, the UE 700 and/or the server 400 may determine the position estimate for the UE 700 by de-weighting or ignoring one measurement of a signal from the signal source 705, e.g., the signal 741, while using (without de-weighting) another signal from the signal source 750, e.g., the signal 742.

Also or alternatively, implementations of the method 800 may include one or more of the following features. In an example implementation, the method 800 includes: using a first receive chain of the mobile device to receive the first wireless signal and to convert the first wireless signal to a first wired signal; and using a second receive chain of the mobile device, different from the first receive chain of the mobile device, to receive the second wireless signal and to convert the second wireless signal to a second wired signal. For example, the UE 700 may receive the signal 741 using the receive chain 760 and receive the signal 742 using the receive chain 770, converting the signals 741, 742 from wireless signals to wired signals.

IMPLEMENTATION EXAMPLES

Implementation examples are provided in the following numbered clauses.

Clause 1. An apparatus comprising:
a memory; and
a processor, communicatively coupled to the memory, configured to:
determine a first signal quality value corresponding to a first wireless signal, of a first frequency and from a signal source, received by a receiver of a mobile device;
determine a second signal quality value corresponding to a second wireless signal, of a second frequency that is different from the first frequency, received by the receiver; and
determine whether at least one difference value, corresponding to the first signal quality value and the second signal quality value, is indicative of the mobile device being in a multipath condition with respect to the signal source.

Clause 2. The apparatus of clause 1, wherein the first signal quality value is a first carrier-to-noise density ratio and the second signal quality value is a second carrier-to-noise density, and wherein to determine whether the at least one difference value is indicative of the mobile device being in the multipath condition with respect to the signal source, the processor is configured to:
determine a first carrier-to-noise density residual value as a first difference between the first signal quality value and a first expected signal quality value corresponding to the first wireless signal for a line-of-sight condition between the mobile device and the signal source;
determine a second carrier-to-noise density residual value as a second difference between the second signal quality value and a second expected signal quality value corresponding to the second wireless signal for the line-of-sight condition between the mobile device and the signal source; and
determine whether a relationship of the first carrier-to-noise density residual value and the second carrier-to-noise density residual value is indicative of the mobile device being in the multipath condition with respect to the signal source.

Clause 3. The apparatus of clause 2, wherein to determine whether the relationship of the first carrier-to-noise density residual value and the second carrier-to-noise density residual value is indicative of the mobile device being in the multipath condition with respect to the signal source, the processor is configured to determine whether a standard deviation of the first carrier-to-noise density residual value and the second carrier-to-noise density residual value exceeds a threshold.

Clause 4. The apparatus of clause 1, wherein the first signal quality value is a first signal-to-noise ratio and the second signal quality value is a second signal-to-noise ratio, and wherein to determine whether the at least one difference value is indicative of the multipath condition of the mobile device with respect to the signal source, the processor is configured to:
determine a first signal-to-noise ratio residual value as a first difference between the first signal quality value and a first expected signal quality value corresponding to the first wireless signal for a line-of-sight condition between the mobile device and the signal source;
determine a second signal-to-noise ratio residual value as a second difference between the second signal quality value and a second expected signal quality value corresponding to the second wireless signal for the line-of-sight condition between the mobile device and the signal source; and
determine whether a relationship of the first signal-to-noise ratio residual value and the second signal-to-noise ratio residual value is indicative of the multipath condition of the mobile device with respect to the signal source.

Clause 5. The apparatus of clause 4, wherein to determine whether the relationship of the first signal-to-noise ratio residual value and the second signal-to-noise ratio residual value is indicative of the multipath condition of the mobile device with respect to the signal source, the processor is configured to determine whether a standard deviation of the first signal-to-noise ratio residual value and the second signal-to-noise ratio residual value exceeds a threshold.

Clause 6. The apparatus of clause 1, wherein to determine whether the at least one difference value is indicative of the multipath condition of the mobile device with respect to the signal source, the processor is configured to determine whether a difference between the first signal quality value and the second signal quality value exceeds a threshold.

Clause 7. The apparatus of clause 6, wherein the processor is further configured to determine a third signal quality value corresponding to a third wireless signal, of a third frequency that is different from the first frequency and the second frequency, received by the receiver, and wherein:
the difference between the first signal quality value and the second signal quality value is a first difference;
the threshold is a first threshold; and
to determine whether the at least one difference value is indicative of the multipath condition of the mobile device with respect to the signal source, the processor is configured to:
determine a second difference comprising a difference between the first signal quality value and the second signal quality value, or a difference between the second signal quality value and the third signal quality value; and
determine whether the first difference exceeds the first threshold and the second difference exceeds a second threshold.

Clause 8. The apparatus of clause 1, wherein the first signal quality value is a carrier-to-noise density ratio.

Clause 9. The apparatus of clause 1, wherein the first signal quality value is a signal-to-noise ratio.

Clause 10. The apparatus of clause 1, wherein the processor is further configured to de-weight or ignore a positioning measurement corresponding to a positioning signal corresponding to the signal source based on the at least one difference value being indicative of the multipath condition of the mobile device with respect to the signal source.

Clause 11. The apparatus of clause 10, wherein the processor is further configured to determine a position estimate for the mobile device while de-weighting or ignoring the positioning measurement corresponding to the positioning signal corresponding to the signal source.

Clause 12. The apparatus of clause 11, wherein the positioning measurement is a first positioning measurement and the positioning signal is a first positioning signal, and wherein the processor is further configured to determine the position estimate for the mobile device without de-weighting or ignoring a second positioning measurement corresponding to a second positioning signal, of a different frequency than the first positioning signal, corresponding to the signal source.

Clause 13. The apparatus of clause 1, wherein the apparatus is the mobile device and the mobile device comprises:
a first receive chain configured to receive the first wireless signal, convert the first wireless signal to a first wired signal, and to provide the first wired signal to the processor; and
a second receive chain, different from the first receive chain, configured to receive the second wireless signal, convert the second wireless signal to a second wired signal, and to provide the second wired signal to the processor.

Clause 14. A multipath condition detection method comprising:
determining a first signal quality value corresponding to a first wireless signal, of a first frequency and from a signal source, received by a receiver of a mobile device;
determining a second signal quality value corresponding to a second wireless signal, of a second frequency that is different from the first frequency, received by the receiver; and
determining whether at least one difference value, corresponding to the first signal quality value and the second signal quality value, is indicative of the mobile device being in a multipath condition with respect to the signal source.

Clause 15. The multipath condition detection method of clause 14, wherein the first signal quality value is a first carrier-to-noise density ratio and the second signal quality value is a second carrier-to-noise density, and wherein determining whether the at least one difference value is indicative of the mobile device being in the multipath condition with respect to the signal source comprises:
determining a first carrier-to-noise density residual value as a first difference between the first signal quality value and a first expected signal quality value corresponding to the first wireless signal for a line-of-sight condition between the mobile device and the signal source;
determining a second carrier-to-noise density residual value as a second difference between the second signal quality value and a second expected signal quality value corresponding to the second wireless signal for the line-of-sight condition between the mobile device and the signal source; and
determining whether a relationship of the first carrier-to-noise density residual value and the second carrier-to-noise density residual value is indicative of the mobile device being in the multipath condition with respect to the signal source.

Clause 16. The multipath condition detection method of clause 15, wherein determining whether the relationship of the first carrier-to-noise density residual value and the second carrier-to-noise density residual value is indicative of the mobile device being in the multipath condition with respect to the signal source comprises determining whether a standard deviation of the first carrier-to-noise density residual value and the second carrier-to-noise density residual value exceeds a threshold.

Clause 17. The multipath condition detection method of clause 14, wherein the first signal quality value is a first signal-to-noise ratio and the second signal quality value is a second signal-to-noise ratio, and wherein determining whether the at least one difference value is indicative of the multipath condition of the mobile device with respect to the signal source comprises:
determining a first signal-to-noise ratio residual value as a first difference between the first signal quality value and a first expected signal quality value corresponding to the first wireless signal for a line-of-sight condition between the mobile device and the signal source;
determining a second signal-to-noise ratio residual value as a second difference between the second signal quality value and a second expected signal quality value corresponding to the second wireless signal for the line-of-sight condition between the mobile device and the signal source; and
determining whether a relationship of the first signal-to-noise ratio residual value and the second signal-to-noise ratio residual value is indicative of the multipath condition of the mobile device with respect to the signal source.

Clause 18. The multipath condition detection method of clause 17, wherein determining whether the relationship of the first signal-to-noise ratio residual value and the second signal-to-noise ratio residual value is indicative of the multipath condition of the mobile device with respect to the signal source comprises determining whether a standard deviation of the first signal-to-noise ratio residual value and the second signal-to-noise ratio residual value exceeds a threshold.

Clause 19. The multipath condition detection method of clause 14, wherein determining whether the at least one difference value is indicative of the multipath condition of the mobile device with respect to the signal source comprises determining whether a difference between the first signal quality value and the second signal quality value exceeds a threshold.

Clause 20. The multipath condition detection method of clause 19, further comprising determining a third signal quality value corresponding to a third wireless signal, of a third frequency that is different from the first frequency and the second frequency, received by the receiver, and wherein:
the difference between the first signal quality value and the second signal quality value is a first difference;
the threshold is a first threshold; and
determining whether the at least one difference value is indicative of the multipath condition of the mobile device with respect to the signal source comprises:
determining a second difference comprising a difference between the first signal quality value and the second signal quality value, or a difference between the second signal quality value and the third signal quality value; and
determining whether the first difference exceeds the first threshold and the second difference exceeds a second threshold.

Clause 21. The multipath condition detection method of clause 14, wherein the first signal quality value is a carrier-to-noise density ratio.

Clause 22. The multipath condition detection method of clause 14, wherein the first signal quality value is a signal-to-noise ratio.

Clause 23. The multipath condition detection method of clause 14, further comprising de-weighting or ignoring a positioning measurement corresponding to a positioning signal corresponding to the signal source based on the at least one difference value being indicative of the multipath condition of the mobile device with respect to the signal source.

Clause 24. The multipath condition detection method of clause 23, further comprising determining a position estimate for the mobile device while de-weighting or ignoring the positioning measurement corresponding to the positioning signal corresponding to the signal source.

Clause 25. The multipath condition detection method of clause 24, wherein the positioning measurement is a first positioning measurement and the positioning signal is a first positioning signal, and wherein determining the position estimate for the mobile device comprises determining the position estimate for the mobile device without de-weighting or ignoring a second positioning measurement corresponding to a second positioning signal, of a different frequency than the first positioning signal, corresponding to the signal source.

Clause 26. The multipath condition detection method of clause 14, further comprising:

using a first receive chain of the mobile device to receive the first wireless signal and to convert the first wireless signal to a first wired signal; and using a second receive chain of the mobile device, different from the first receive chain of the mobile device, to receive the second wireless signal and to convert the second wireless signal to a second wired signal.

Clause 27. An apparatus comprising:

means for determining a first signal quality value corresponding to a first wireless signal, of a first frequency and from a signal source, received by a receiver of a mobile device;

means for determining a second signal quality value corresponding to a second wireless signal, of a second frequency that is different from the first frequency, received by the receiver; and means for determining whether at least one difference value, corresponding to the first signal quality value and the second signal quality value, is indicative of the mobile device being in a multipath condition with respect to the signal source.

Clause 28. The apparatus of clause 27, wherein the first signal quality value is a first carrier-to-noise density ratio and the second signal quality value is a second carrier-to-noise density, and wherein the means for determining whether the at least one difference value is indicative of the mobile device being in the multipath condition with respect to the signal source comprise:

means for determining a first carrier-to-noise density residual value as a first difference between the first signal quality value and a first expected signal quality value corresponding to the first wireless signal for a line-of-sight condition between the mobile device and the signal source;

means for determining a second carrier-to-noise density residual value as a second difference between the second signal quality value and a second expected signal quality value corresponding to the second wireless signal for the line-of-sight condition between the mobile device and the signal source; and means for determining whether a relationship of the first carrier-to-noise density residual value and the second carrier-to-noise density residual value is indicative of the mobile device being in the multipath condition with respect to the signal source.

Clause 29. The apparatus of clause 28, wherein the means for determining whether the relationship of the first carrier-to-noise density residual value and the second carrier-to-noise density residual value is indicative of the mobile device being in the multipath condition with respect to the signal source comprise means for determining whether a standard deviation of the first carrier-to-noise density residual value and the second carrier-to-noise density residual value exceeds a threshold.

Clause 30. The apparatus of clause 27, wherein the first signal quality value is a first signal-to-noise ratio and the second signal quality value is a second signal-to-noise ratio, and wherein the means for determining whether the at least one difference value is indicative of the multipath condition of the mobile device with respect to the signal source comprise:

means for determining a first signal-to-noise ratio residual value as a first difference between the first signal quality value and a first expected signal quality value corresponding to the first wireless signal for a line-of-sight condition between the mobile device and the signal source;

means for determining a second signal-to-noise ratio residual value as a second difference between the second signal quality value and a second expected signal quality value corresponding to the second wireless signal for the line-of-sight condition between the mobile device and the signal source; and means for determining whether a relationship of the first signal-to-noise ratio residual value and the second signal-to-noise ratio residual value is indicative of the multipath condition of the mobile device with respect to the signal source.

Clause 31. The apparatus of clause 30, wherein the means for determining whether the relationship of the first signal-to-noise ratio residual value and the second signal-to-noise ratio residual value is indicative of the multipath condition of the mobile device with respect to the signal source comprise means for determining whether a standard deviation of the first signal-to-noise ratio residual value and the second signal-to-noise ratio residual value exceeds a threshold.

Clause 32. The apparatus of clause 27, wherein the means for determining whether the at least one difference value is indicative of the multipath condition of the mobile device with respect to the signal source comprise means for determining whether a difference between the first signal quality value and the second signal quality value exceeds a threshold.

Clause 33. The apparatus of clause 32, further comprising means for determining a third signal quality value corresponding to a third wireless signal, of a third frequency that is different from the first frequency and the second frequency, received by the receiver, and wherein:

the difference between the first signal quality value and the second signal quality value is a first difference;

the threshold is a first threshold; and the means for determining whether the at least one difference value is indicative of the multipath condition of the mobile device with respect to the signal source comprise:

means for determining a second difference comprising a difference between the first signal quality value and the second signal quality value, or a difference between the second signal quality value and the third signal quality value; and means for determining whether the first difference exceeds the first threshold and the second difference exceeds a second threshold.

Clause 34. The apparatus of clause 27, wherein the first signal quality value is a carrier-to-noise density ratio.

Clause 35. The apparatus of clause 27, wherein the first signal quality value is a signal-to-noise ratio.

Clause 36. The apparatus of clause 27, further comprising means for de-weighting or ignoring a positioning measurement corresponding to a positioning signal corresponding to the signal source based on the at least one difference value being indicative of the multipath condition of the mobile device with respect to the signal source.

Clause 37. The apparatus of clause 36, further comprising means for determining a position estimate for the mobile device while de-weighting or ignoring the positioning measurement corresponding to the positioning signal corresponding to the signal source.

Clause 38. The apparatus of clause 37, wherein the positioning measurement is a first positioning measurement and the positioning signal is a first positioning signal, and wherein the means for determining the position estimate for the mobile device comprise means for determining the position estimate for the mobile device without de-weighting or ignoring a second positioning measurement corresponding to a second positioning signal, of a different frequency than the first positioning signal, corresponding to the signal source.

Clause 39. The apparatus of clause 27, further comprising:

means for receiving the first wireless signal and converting the first wireless signal to a first wired signal; and means for, different from the means for receiving the first wireless signal, for receiving the second wireless signal and converting the second wireless signal to a second wired signal.

Clause 40. A non-transitory, processor-readable storage medium comprising processor-readable instructions to cause a processor of an apparatus to:

determine a first signal quality value corresponding to a first wireless signal, of a first frequency and from a signal source, received by a receiver of a mobile device;

determine a second signal quality value corresponding to a second wireless signal, of a second frequency that is different from the first frequency, received by the receiver; and determine whether at least one difference value, corresponding to the first signal quality value and the second signal quality value, is indicative of the mobile device being in a multipath condition with respect to the signal source.

Clause 41. The non-transitory, processor-readable storage medium of clause 40, wherein the first signal quality value is a first carrier-to-noise density ratio and the second signal quality value is a second carrier-to-noise density, and wherein the processor-readable instructions to cause the processor to determine whether the at least one difference value is indicative of the mobile device being in the multipath condition with respect to the signal source comprise processor-readable instructions to cause the processor to:

determine a first carrier-to-noise density residual value as a first difference between the first signal quality value and a first expected signal quality value corresponding to the first wireless signal for a line-of-sight condition between the mobile device and the signal source;

determine a second carrier-to-noise density residual value as a second difference between the second signal quality value and a second expected signal quality value corresponding to the second wireless signal for the line-of-sight condition between the mobile device and the signal source; and determine whether a relationship of the first carrier-to-noise density residual value and the second carrier-to-noise density residual value is indicative of the mobile device being in the multipath condition with respect to the signal source.

Clause 42. The non-transitory, processor-readable storage medium of clause 41, wherein the processor-readable instructions to cause the processor to determine whether the relationship of the first carrier-to-noise density residual value and the second carrier-to-noise density residual value is indicative of the mobile device being in the multipath condition with respect to the signal source comprise processor-readable instructions to cause the processor to determine whether a standard deviation of the first carrier-to-noise density residual value and the second carrier-to-noise density residual value exceeds a threshold.

Clause 43. The non-transitory, processor-readable storage medium of clause 40, wherein the first signal quality value is a first signal-to-noise ratio and the second signal quality value is a second signal-to-noise ratio, and wherein the processor-readable instructions to cause the processor to determine whether the at least one difference value is indicative of the multipath condition of the mobile device with respect to the signal source comprise processor-readable instructions to cause the processor to:

determine a first signal-to-noise ratio residual value as a first difference between the first signal quality value and a first expected signal quality value corresponding to the first wireless signal for a line-of-sight condition between the mobile device and the signal source;

determine a second signal-to-noise ratio residual value as a second difference between the second signal quality value and a second expected signal quality value corresponding to the second wireless signal for the line-of-sight condition between the mobile device and the signal source; and determine whether a relationship of the first signal-to-noise ratio residual value and the second signal-to-noise ratio residual value is indicative of the multipath condition of the mobile device with respect to the signal source.

Clause 44. The non-transitory, processor-readable storage medium of clause 43, wherein the processor-readable instructions to cause the processor to determine whether the relationship of the first signal-to-noise ratio residual value and the second signal-to-noise ratio residual value is indicative of the multipath condition of the mobile device with respect to the signal source comprise processor-readable instructions to cause the processor to determine whether a standard deviation of the first signal-to-noise ratio residual value and the second signal-to-noise ratio residual value exceeds a threshold.

Clause 45. The non-transitory, processor-readable storage medium of clause 40, wherein the processor-readable instructions to cause the processor to determine whether the at least one difference value is indicative of the multipath condition of the mobile device with respect to the signal source comprise processor-readable instructions to cause the processor to determine whether a difference between the first signal quality value and the second signal quality value exceeds a threshold.

Clause 46. The non-transitory, processor-readable storage medium of clause 45, further comprising processor-readable instructions to cause the processor to determine a third signal quality value corresponding to a third wireless signal, of a third frequency that is different from the first frequency and the second frequency, received by the receiver, and wherein:

the difference between the first signal quality value and the second signal quality value is a first difference;

the threshold is a first threshold; and the processor-readable instructions to cause the processor to determining whether the at least one difference value is indicative of the multipath condition of the mobile device with respect to the signal source comprise processor-readable instructions to cause the processor to:

determine a second difference comprising a difference between the first signal quality value and the second signal quality value, or a difference between the second signal quality value and the third signal quality value; and determine whether the first difference exceeds the first threshold and the second difference exceeds a second threshold.

Clause 47. The non-transitory, processor-readable storage medium of clause 40, wherein the first signal quality value is a carrier-to-noise density ratio.

Clause 48. The non-transitory, processor-readable storage medium of clause 40, wherein the first signal quality value is a signal-to-noise ratio.

Clause 49. The non-transitory, processor-readable storage medium of clause 40, further comprising processor-readable instructions to cause the processor to de-weight or ignore a positioning measurement corresponding to a positioning signal corresponding to the signal source based on the at least one difference value being indicative of the multipath condition of the mobile device with respect to the signal source.

Clause 50. The non-transitory, processor-readable storage medium of clause 49, further comprising processor-readable instructions to cause the processor to determine a position estimate for the mobile device while de-weighting or ignoring the positioning measurement corresponding to the positioning signal corresponding to the signal source.

Clause 51. The non-transitory, processor-readable storage medium of clause 50, wherein the positioning measurement is a first positioning measurement and the positioning signal is a first positioning signal, and wherein the processor-readable instructions to cause the processor to determine the position estimate for the mobile device comprise processor-readable instructions to cause the processor to determine the position estimate for the mobile device without de-weighting or ignoring a second positioning measurement corresponding to a second positioning signal, of a different frequency than the first positioning signal, corresponding to the signal source.

Other Considerations

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, the singular forms "a," "an," and "the" include the plural forms as well, unless the context clearly indicates otherwise. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Also, as used herein, "or" as used in a list of items (possibly prefaced by "at least one of" or prefaced by "one or more of") indicates a disjunctive list such that, for example, a list of "at least one of A, B, or C," or a list of "one or more of A, B, or C" or a list of "A or B or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A, or may be configured to perform the function regarding B, or may be configured to perform the function regarding A and B. For example, a phrase of "a processor configured to measure at least one of A or B" or "a processor configured to measure A or measure B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure).

As used herein, unless otherwise stated, a statement that a function or operation is "based on" an item or condition means that the function or operation is based on the stated item or condition and may be based on one or more items and/or conditions in addition to the stated item or condition.

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed. Components, functional or otherwise, shown in the figures and/or discussed herein as being connected or communicating with each other are communicatively coupled unless otherwise noted. That is, they may be directly or indirectly connected to enable communication between them.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection, between wireless communication devices. A wireless communication system (also called a wireless communications system, a wireless communication network, or a wireless communications network) may not have all communications transmitted wirelessly, but is configured to have at least some communications transmitted wirelessly. Further, the term "wireless communication device," or similar term, does not require that the functionality of the device is exclusively, or even primarily, for communication, or that communication using the wireless communication device is exclusively, or even primarily, wireless, or that the device be a mobile device, but indicates that the device includes wireless communication capability (one-way or two-way), e.g., includes at least one radio (each radio being part of a transmitter, receiver, or transceiver) for wireless communication.

Specific details are given in the description herein to provide a thorough understanding of example configurations (including implementations). However, configurations may be practiced without these specific details. For example, well-known circuits, processes, algorithms, structures, and techniques have been shown without unnecessary detail in order to avoid obscuring the configurations. The description herein provides example configurations, and does not limit the scope, applicability, or configurations of the claims. Rather, the preceding description of the configurations provides a description for implementing described techniques. Various changes may be made in the function and arrangement of elements.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Having described several example configurations, various modifications, alternative constructions, and equivalents may be used. For example, the above elements may be components of a larger system, wherein other rules may take precedence over or otherwise modify the application of the disclosure. Also, a number of operations may be undertaken before, during, or after the above elements are considered. Accordingly, the above description does not bound the scope of the claims.

Unless otherwise indicated, "about" and/or "approximately" as used herein when referring to a measurable value such as an amount, a temporal duration, and the like, encompasses variations of ±20% or ±10%, ±5%, or +0.1% from the specified value, as appropriate in the context of the systems, devices, circuits, methods, and other implementations described herein. Unless otherwise indicated, "substantially" as used herein when referring to a measurable value such as an amount, a temporal duration, a physical attribute (such as frequency), and the like, also encompasses variations of ±20% or ±10%, ±5%, or +0.1% from the specified value, as appropriate in the context of the systems, devices, circuits, methods, and other implementations described herein.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

The invention claimed is:

1. An apparatus comprising:
   a memory; and
   a processor, communicatively coupled to the memory, configured to:
      determine a first signal quality value corresponding to a first wireless signal, of a first frequency and from a signal source, received by a receiver of a mobile device;
      determine a second signal quality value corresponding to a second wireless signal, of a second frequency that is different from the first frequency, received by the receiver; and
      determine whether at least one difference value, corresponding to the first signal quality value and the second signal quality value, is indicative of the mobile device being in a multipath condition with respect to the signal source.

2. The apparatus of claim 1, wherein the first signal quality value is a first carrier-to-noise density ratio and the second signal quality value is a second carrier-to-noise density, and wherein to determine whether the at least one difference value is indicative of the mobile device being in the multipath condition with respect to the signal source, the processor is configured to:
   determine a first carrier-to-noise density residual value as a first difference between the first signal quality value and a first expected signal quality value corresponding to the first wireless signal for a line-of-sight condition between the mobile device and the signal source;
   determine a second carrier-to-noise density residual value as a second difference between the second signal quality value and a second expected signal quality value corresponding to the second wireless signal for the line-of-sight condition between the mobile device and the signal source; and
   determine whether a relationship of the first carrier-to-noise density residual value and the second carrier-to-noise density residual value is indicative of the mobile device being in the multipath condition with respect to the signal source.

3. The apparatus of claim 2, wherein to determine whether the relationship of the first carrier-to-noise density residual value and the second carrier-to-noise density residual value is indicative of the mobile device being in the multipath condition with respect to the signal source, the processor is configured to determine whether a standard deviation of the first carrier-to-noise density residual value and the second carrier-to-noise density residual value exceeds a threshold.

4. The apparatus of claim 1, wherein the first signal quality value is a first signal-to-noise ratio and the second signal quality value is a second signal-to-noise ratio, and wherein to determine whether the at least one difference value is indicative of the multipath condition of the mobile device with respect to the signal source, the processor is configured to:
  determine a first signal-to-noise ratio residual value as a first difference between the first signal quality value and a first expected signal quality value corresponding to the first wireless signal for a line-of-sight condition between the mobile device and the signal source;
  determine a second signal-to-noise ratio residual value as a second difference between the second signal quality value and a second expected signal quality value corresponding to the second wireless signal for the line-of-sight condition between the mobile device and the signal source; and
  determine whether a relationship of the first signal-to-noise ratio residual value and the second signal-to-noise ratio residual value is indicative of the multipath condition of the mobile device with respect to the signal source.

5. The apparatus of claim 4, wherein to determine whether the relationship of the first signal-to-noise ratio residual value and the second signal-to-noise ratio residual value is indicative of the multipath condition of the mobile device with respect to the signal source, the processor is configured to determine whether a standard deviation of the first signal-to-noise ratio residual value and the second signal-to-noise ratio residual value exceeds a threshold.

6. The apparatus of claim 1, wherein to determine whether the at least one difference value is indicative of the multipath condition of the mobile device with respect to the signal source, the processor is configured to determine whether a difference between the first signal quality value and the second signal quality value exceeds a threshold.

7. The apparatus of claim 6, wherein the processor is further configured to determine a third signal quality value corresponding to a third wireless signal, of a third frequency that is different from the first frequency and the second frequency, received by the receiver, and wherein:
  the difference between the first signal quality value and the second signal quality value is a first difference;
  the threshold is a first threshold; and
  to determine whether the at least one difference value is indicative of the multipath condition of the mobile device with respect to the signal source, the processor is configured to:
    determine a second difference comprising a difference between the first signal quality value and the second signal quality value, or a difference between the second signal quality value and the third signal quality value; and
    determine whether the first difference exceeds the first threshold and the second difference exceeds a second threshold.

8. The apparatus of claim 1, wherein the first signal quality value is a carrier-to-noise density ratio.

9. The apparatus of claim 1, wherein the first signal quality value is a signal-to-noise ratio.

10. The apparatus of claim 1, wherein the processor is further configured to de-weight or ignore a positioning measurement corresponding to a positioning signal corresponding to the signal source based on the at least one difference value being indicative of the multipath condition of the mobile device with respect to the signal source.

11. The apparatus of claim 10, wherein the processor is further configured to determine a position estimate for the mobile device while de-weighting or ignoring the positioning measurement corresponding to the positioning signal corresponding to the signal source.

12. The apparatus of claim 11, wherein the positioning measurement is a first positioning measurement and the positioning signal is a first positioning signal, and wherein the processor is further configured to determine the position estimate for the mobile device without de-weighting or ignoring a second positioning measurement corresponding to a second positioning signal, of a different frequency than the first positioning signal, corresponding to the signal source.

13. The apparatus of claim 1, wherein the apparatus is the mobile device and the mobile device comprises:
  a first receive chain configured to receive the first wireless signal, convert the first wireless signal to a first wired signal, and to provide the first wired signal to the processor; and
  a second receive chain, different from the first receive chain, configured to receive the second wireless signal, convert the second wireless signal to a second wired signal, and to provide the second wired signal to the processor.

14. A multipath condition detection method comprising:
  determining a first signal quality value corresponding to a first wireless signal, of a first frequency and from a signal source, received by a receiver of a mobile device;
  determining a second signal quality value corresponding to a second wireless signal, of a second frequency that is different from the first frequency, received by the receiver; and
  determining whether at least one difference value, corresponding to the first signal quality value and the second signal quality value, is indicative of the mobile device being in a multipath condition with respect to the signal source.

15. The multipath condition detection method of claim 14, wherein the first signal quality value is a first carrier-to-noise density ratio and the second signal quality value is a second carrier-to-noise density, and wherein determining whether the at least one difference value is indicative of the mobile device being in the multipath condition with respect to the signal source comprises:
  determining a first carrier-to-noise density residual value as a first difference between the first signal quality value and a first expected signal quality value corresponding to the first wireless signal for a line-of-sight condition between the mobile device and the signal source;
  determining a second carrier-to-noise density residual value as a second difference between the second signal quality value and a second expected signal quality value corresponding to the second wireless signal for the line-of-sight condition between the mobile device and the signal source; and
  determining whether a relationship of the first carrier-to-noise density residual value and the second carrier-to-noise density residual value is indicative of the mobile device being in the multipath condition with respect to the signal source.

16. The multipath condition detection method of claim 15, wherein determining whether the relationship of the first carrier-to-noise density residual value and the second carrier-to-noise density residual value is indicative of the mobile device being in the multipath condition with respect to the signal source comprises determining whether a standard deviation of the first carrier-to-noise density residual value and the second carrier-to-noise density residual value exceeds a threshold.

17. The multipath condition detection method of claim 14, wherein the first signal quality value is a first signal-to-noise ratio and the second signal quality value is a second signal-to-noise ratio, and wherein determining whether the at least one difference value is indicative of the multipath condition of the mobile device with respect to the signal source comprises:
   determining a first signal-to-noise ratio residual value as a first difference between the first signal quality value and a first expected signal quality value corresponding to the first wireless signal for a line-of-sight condition between the mobile device and the signal source;
   determining a second signal-to-noise ratio residual value as a second difference between the second signal quality value and a second expected signal quality value corresponding to the second wireless signal for the line-of-sight condition between the mobile device and the signal source; and
   determining whether a relationship of the first signal-to-noise ratio residual value and the second signal-to-noise ratio residual value is indicative of the multipath condition of the mobile device with respect to the signal source.

18. The multipath condition detection method of claim 17, wherein determining whether the relationship of the first signal-to-noise ratio residual value and the second signal-to-noise ratio residual value is indicative of the multipath condition of the mobile device with respect to the signal source comprises determining whether a standard deviation of the first signal-to-noise ratio residual value and the second signal-to-noise ratio residual value exceeds a threshold.

19. The multipath condition detection method of claim 14, wherein determining whether the at least one difference value is indicative of the multipath condition of the mobile device with respect to the signal source comprises determining whether a difference between the first signal quality value and the second signal quality value exceeds a threshold.

20. The multipath condition detection method of claim 19, further comprising determining a third signal quality value corresponding to a third wireless signal, of a third frequency that is different from the first frequency and the second frequency, received by the receiver, and wherein:
   the difference between the first signal quality value and the second signal quality value is a first difference;
   the threshold is a first threshold; and
   determining whether the at least one difference value is indicative of the multipath condition of the mobile device with respect to the signal source comprises:
      determining a second difference comprising a difference between the first signal quality value and the second signal quality value, or a difference between the second signal quality value and the third signal quality value; and
      determining whether the first difference exceeds the first threshold and the second difference exceeds a second threshold.

21. The multipath condition detection method of claim 14, wherein the first signal quality value is a carrier-to-noise density ratio.

22. The multipath condition detection method of claim 14, wherein the first signal quality value is a signal-to-noise ratio.

23. The multipath condition detection method of claim 14, further comprising de-weighting or ignoring a positioning measurement corresponding to a positioning signal corresponding to the signal source based on the at least one difference value being indicative of the multipath condition of the mobile device with respect to the signal source.

24. The multipath condition detection method of claim 23, further comprising determining a position estimate for the mobile device while de-weighting or ignoring the positioning measurement corresponding to the positioning signal corresponding to the signal source.

25. The multipath condition detection method of claim 24, wherein the positioning measurement is a first positioning measurement and the positioning signal is a first positioning signal, and wherein determining the position estimate for the mobile device comprises determining the position estimate for the mobile device without de-weighting or ignoring a second positioning measurement corresponding to a second positioning signal, of a different frequency than the first positioning signal, corresponding to the signal source.

26. The multipath condition detection method of claim 14, further comprising:
   using a first receive chain of the mobile device to receive the first wireless signal and to convert the first wireless signal to a first wired signal; and
   using a second receive chain of the mobile device, different from the first receive chain of the mobile device, to receive the second wireless signal and to convert the second wireless signal to a second wired signal.

27. An apparatus comprising:
   means for determining a first signal quality value corresponding to a first wireless signal, of a first frequency and from a signal source, received by a receiver of a mobile device;
   means for determining a second signal quality value corresponding to a second wireless signal, of a second frequency that is different from the first frequency, received by the receiver; and
   means for determining whether at least one difference value, corresponding to the first signal quality value and the second signal quality value, is indicative of the mobile device being in a multipath condition with respect to the signal source.

28. The apparatus of claim 27, wherein the first signal quality value is a first carrier-to-noise density ratio and the second signal quality value is a second carrier-to-noise density, and wherein the means for determining whether the at least one difference value is indicative of the mobile device being in the multipath condition with respect to the signal source comprise:
   means for determining a first carrier-to-noise density residual value as a first difference between the first signal quality value and a first expected signal quality value corresponding to the first wireless signal for a line-of-sight condition between the mobile device and the signal source;
   means for determining a second carrier-to-noise density residual value as a second difference between the second signal quality value and a second expected signal quality value corresponding to the second wireless signal for the line-of-sight condition between the mobile device and the signal source; and
   means for determining whether a relationship of the first carrier-to-noise density residual value and the second carrier-to-noise density residual value is indicative of the mobile device being in the multipath condition with respect to the signal source.

29. The apparatus of claim 28, wherein the means for determining whether the relationship of the first carrier-to-noise density residual value and the second carrier-to-noise density residual value is indicative of the mobile device being in the multipath condition with respect to the signal source comprise means for determining whether a standard deviation of the first carrier-to-noise density residual value and the second carrier-to-noise density residual value exceeds a threshold.

30. The apparatus of claim 27, wherein the first signal quality value is a first signal-to-noise ratio and the second signal quality value is a second signal-to-noise ratio, and wherein the means for determining whether the at least one difference value is indicative of the multipath condition of the mobile device with respect to the signal source comprise:
    means for determining a first signal-to-noise ratio residual value as a first difference between the first signal quality value and a first expected signal quality value corresponding to the first wireless signal for a line-of-sight condition between the mobile device and the signal source;
    means for determining a second signal-to-noise ratio residual value as a second difference between the second signal quality value and a second expected signal quality value corresponding to the second wireless signal for the line-of-sight condition between the mobile device and the signal source; and
    means for determining whether a relationship of the first signal-to-noise ratio residual value and the second signal-to-noise ratio residual value is indicative of the multipath condition of the mobile device with respect to the signal source.

31. The apparatus of claim 30, wherein the means for determining whether the relationship of the first signal-to-noise ratio residual value and the second signal-to-noise ratio residual value is indicative of the multipath condition of the mobile device with respect to the signal source comprise means for determining whether a standard deviation of the first signal-to-noise ratio residual value and the second signal-to-noise ratio residual value exceeds a threshold.

32. The apparatus of claim 27, wherein the means for determining whether the at least one difference value is indicative of the multipath condition of the mobile device with respect to the signal source comprise means for determining whether a difference between the first signal quality value and the second signal quality value exceeds a threshold.

33. The apparatus of claim 32, further comprising means for determining a third signal quality value corresponding to a third wireless signal, of a third frequency that is different from the first frequency and the second frequency, received by the receiver, and wherein:
    the difference between the first signal quality value and the second signal quality value is a first difference;
    the threshold is a first threshold; and
    the means for determining whether the at least one difference value is indicative of the multipath condition of the mobile device with respect to the signal source comprise:
        means for determining a second difference comprising a difference between the first signal quality value and the second signal quality value, or a difference between the second signal quality value and the third signal quality value; and
        means for determining whether the first difference exceeds the first threshold and the second difference exceeds a second threshold.

34. The apparatus of claim 27, wherein the first signal quality value is a carrier-to-noise density ratio.

35. The apparatus of claim 27, wherein the first signal quality value is a signal-to-noise ratio.

36. The apparatus of claim 27, further comprising means for de-weighting or ignoring a positioning measurement corresponding to a positioning signal corresponding to the signal source based on the at least one difference value being indicative of the multipath condition of the mobile device with respect to the signal source.

37. The apparatus of claim 36, further comprising means for determining a position estimate for the mobile device while de-weighting or ignoring the positioning measurement corresponding to the positioning signal corresponding to the signal source.

38. The apparatus of claim 37, wherein the positioning measurement is a first positioning measurement and the positioning signal is a first positioning signal, and wherein the means for determining the position estimate for the mobile device comprise means for determining the position estimate for the mobile device without de-weighting or ignoring a second positioning measurement corresponding to a second positioning signal, of a different frequency than the first positioning signal, corresponding to the signal source.

39. The apparatus of claim 27, further comprising:
    means for receiving the first wireless signal and converting the first wireless signal to a first wired signal; and
    means for, different from the means for receiving the first wireless signal, for receiving the second wireless signal and converting the second wireless signal to a second wired signal.

40. A non-transitory, processor-readable storage medium comprising processor-readable instructions to cause a processor of an apparatus to:
    determine a first signal quality value corresponding to a first wireless signal, of a first frequency and from a signal source, received by a receiver of a mobile device;
    determine a second signal quality value corresponding to a second wireless signal, of a second frequency that is different from the first frequency, received by the receiver; and
    determine whether at least one difference value, corresponding to the first signal quality value and the second signal quality value, is indicative of the mobile device being in a multipath condition with respect to the signal source.

41. The non-transitory, processor-readable storage medium of claim 40, wherein the first signal quality value is a first carrier-to-noise density ratio and the second signal quality value is a second carrier-to-noise density, and wherein the processor-readable instructions to cause the processor to determine whether the at least one difference value is indicative of the mobile device being in the multipath condition with respect to the signal source comprise processor-readable instructions to cause the processor to:
    determine a first carrier-to-noise density residual value as a first difference between the first signal quality value and a first expected signal quality value corresponding to the first wireless signal for a line-of-sight condition between the mobile device and the signal source;
    determine a second carrier-to-noise density residual value as a second difference between the second signal quality value and a second expected signal quality value corresponding to the second wireless signal for the line-of-sight condition between the mobile device and the signal source; and determine whether a relationship of the first carrier-to-noise density residual value and the second carrier-to-noise density residual value is indicative of the mobile device being in the multipath condition with respect to the signal source.

* * * * *